United States Patent
Mizumura et al.

(10) Patent No.: US 10,662,491 B2
(45) Date of Patent: May 26, 2020

(54) GRAIN-ORIENTED ELECTRICAL STEEL SHEET

(71) Applicant: NIPPON STEEL & SUMITOMO METAL CORPORATION, Tokyo (JP)

(72) Inventors: Takahito Mizumura, Tokyo (JP); Fumiaki Takahashi, Tokyo (JP); Masato Mizokami, Tokyo (JP); Hisashi Mogi, Tokyo (JP); Hideyuki Hamamura, Tokyo (JP); Hirofumi Imai, Tokyo (JP); Shinya Hayashi, Tokyo (JP); Kenichi Murakami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/080,255

(22) PCT Filed: Mar. 31, 2017

(86) PCT No.: PCT/JP2017/013622
§ 371 (c)(1),
(2) Date: Aug. 27, 2018

(87) PCT Pub. No.: WO2017/171013
PCT Pub. Date: Oct. 5, 2017

(65) Prior Publication Data
US 2019/0048434 A1    Feb. 14, 2019

(30) Foreign Application Priority Data

Mar. 31, 2016    (JP) .................................. 2016-073151

(51) Int. Cl.
*C21D 8/12* (2006.01)
*C22C 38/60* (2006.01)
(Continued)

(52) U.S. Cl.
CPC .............. *C21D 8/1222* (2013.01); *B32B 3/30* (2013.01); *B32B 15/04* (2013.01); *C21D 6/008* (2013.01);
(Continued)

(58) Field of Classification Search
CPC ........... B32B 3/30; B32B 15/04; B32B 15/18; B32B 33/00; B32B 2307/538;
(Continued)

(56) References Cited

U.S. PATENT DOCUMENTS 6,228,182 B1    5/2001 Nakano et al.
8,568,857 B2 *  10/2013 Takashima ............ C22C 38/001
                                                         148/307

(Continued)

FOREIGN PATENT DOCUMENTS

JP    6-57335 A    3/1994
JP    6-100939 A   4/1994

(Continued)

OTHER PUBLICATIONS

International Search Report for PCT/JP2017/013622 dated Jul. 4, 2017.

(Continued)

*Primary Examiner* — Donald J Loney
(74) *Attorney, Agent, or Firm* — Birch, Stewart, Kolasch & Birch, LLP

(57) ABSTRACT

A grain-oriented electrical steel sheet comprising a steel sheet having a surface on which grooves, in which an extending direction crosses a rolling direction and a depth direction is parallel to a sheet thickness direction, are formed, and wherein a molten solidified substance ranging in parallel to the groove exists on both sides of the groove on the surface of the steel sheet, and a height becoming a maximum frequency in a height distribution of height data (Continued)

in which the surface of the steel sheet in a specific area including the groove is measured at regular intervals is set as a virtual plane, and a value of V2/V1 is more than 0.10 and less than 0.80, wherein V1 is a space volume of recess parts recessed from the virtual plane and V2 is a volume of projection parts projected from the virtual plane.

8 Claims, 12 Drawing Sheets

(51) Int. Cl.
| | |
|---|---|
| *C22C 38/00* | (2006.01) |
| *H01F 1/18* | (2006.01) |
| *B32B 3/30* | (2006.01) |
| *B32B 15/04* | (2006.01) |
| *C21D 6/00* | (2006.01) |
| *C21D 9/46* | (2006.01) |
| *C22C 38/02* | (2006.01) |
| *C22C 38/04* | (2006.01) |
| *C22C 38/06* | (2006.01) |
| *C22C 38/42* | (2006.01) |
| *B32B 33/00* | (2006.01) |
| *B32B 15/18* | (2006.01) |
| *H01F 1/14* | (2006.01) |

(52) U.S. Cl.
CPC ............ *C21D 8/12* (2013.01); *C21D 8/1233* (2013.01); *C21D 8/1255* (2013.01); *C21D 8/1261* (2013.01); *C21D 8/1272* (2013.01); *C21D 9/46* (2013.01); *C22C 38/00* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/60* (2013.01); *H01F 1/18* (2013.01); *B32B 15/18* (2013.01); *B32B 33/00* (2013.01); *B32B 2307/538* (2013.01); *B32B 2311/30* (2013.01); *C21D 2201/05* (2013.01); *C22C 2202/02* (2013.01); *H01F 1/14* (2013.01); *Y10T 428/12389* (2015.01); *Y10T 428/12993* (2015.01); *Y10T 428/24479* (2015.01); *Y10T 428/24612* (2015.01)

(58) Field of Classification Search
CPC ......... B32B 2311/30; Y10T 428/12993; Y10T 428/12389; Y10T 428/24479; Y10T 428/24612; H01F 1/14; C22C 38/60; C22C 38/42; C22C 38/06; C22C 38/04; C22C 38/02; C22C 38/008; C22C 38/002; C22C 38/001; C21C 2202/02
See application file for complete search history.

(56) References Cited

U.S. PATENT DOCUMENTS

| | | | |
|---|---|---|---|
| 9,139,886 | B2 | 9/2015 | Sakai et al. |
| 9,406,437 | B2* | 8/2016 | Omura ............ H01F 1/18 |
| 2006/0169362 | A1* | 8/2006 | Sakai ............ C21D 8/1294 |
| | | | 148/110 |
| 2013/0017408 | A1 | 1/2013 | Sakai et al. |
| 2013/0139932 | A1 | 6/2013 | Sakai et al. |
| 2015/0059932 | A1 | 3/2015 | Hirano et al. |

FOREIGN PATENT DOCUMENTS

| | | |
|---|---|---|
| JP | 2012-87332 A | 5/2012 |
| JP | 2012-177164 A | 9/2012 |
| JP | 5234222 B2 | 7/2013 |
| WO | WO 2011/125672 A1 | 10/2011 |
| WO | WO 2012/033197 A1 | 3/2012 |
| WO | WO 2012/172624 A1 | 12/2012 |

OTHER PUBLICATIONS

Written Opinion of the International Searching Authority for PCT/JP2017/013622 (PCT/ISA/237) dated Jul. 4, 2017.
International Preliminary Report on Patentability and English translation of the Written Opinion of the International Searching Authority (Forms PCT/IB/373 and PCT/ISA/237) for International Application No. PCT/JP2017/013622, dated Oct. 11, 2018.
Extended European Search Report for European Application No. 17775544.4, dated Jul. 25, 2019.

* cited by examiner

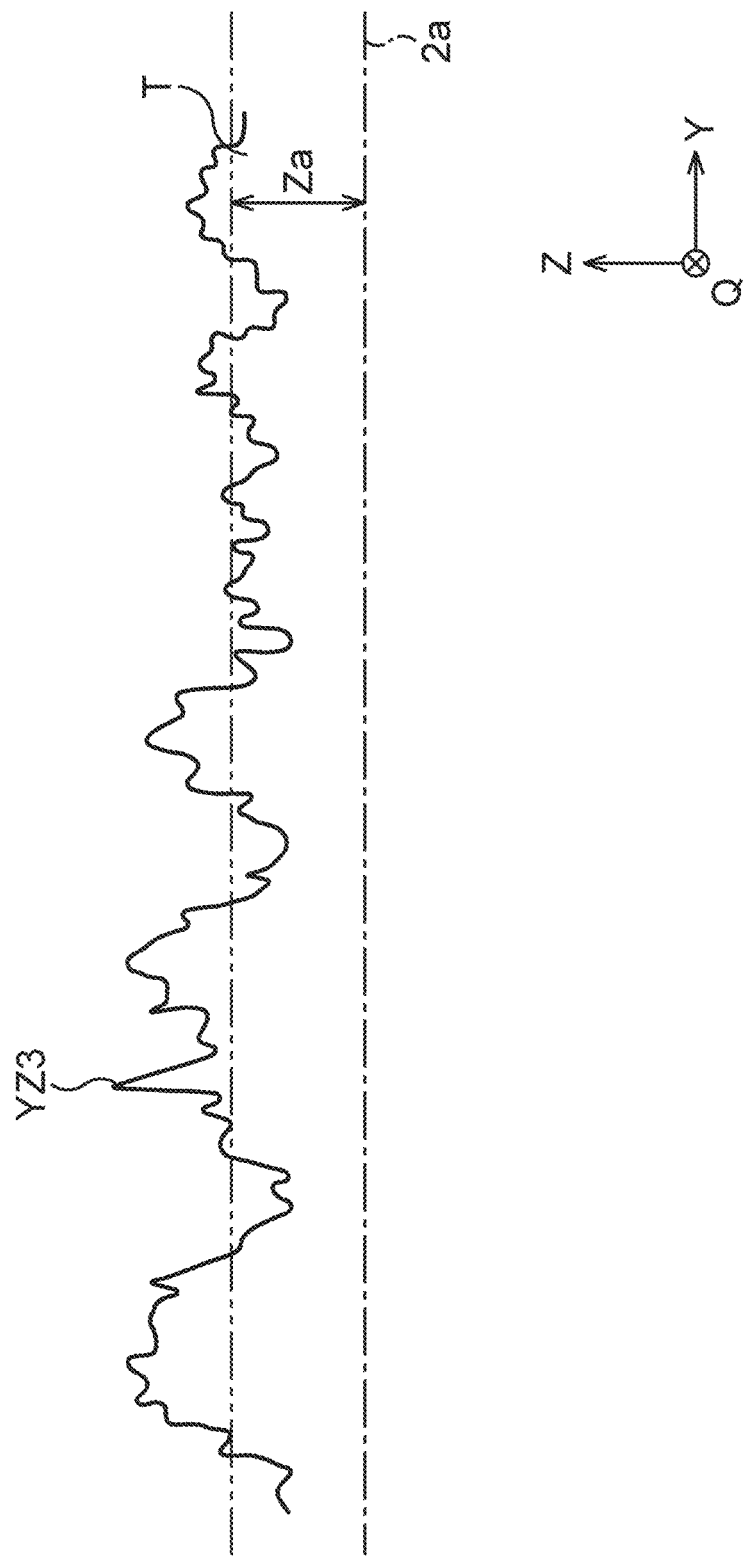

GRAIN-ORIENTED ELECTRICAL STEEL SHEET

TECHNICAL FIELD

The present invention relates to a grain-oriented electrical steel sheet.

BACKGROUND ART

Conventionally, as a steel sheet for an iron core (core) of a transformer, there is known a grain-oriented electrical steel sheet which exhibits an excellent magnetic property in a specific direction. The grain-oriented electrical steel sheet is a steel sheet in which a crystal orientation is controlled so that an axis of easy magnetization of crystal grains and a rolling direction correspond with each other by a combination of cold rolling and annealing. A core loss of the grain-oriented electrical steel sheet is desirably as low as possible.

There is known a grain-oriented electrical steel sheet in which an insulating film is formed on a surface of the steel sheet (base steel sheet) in which the crystal orientation is controlled in order to reduce the core loss as described above. This insulating film is responsible for a role in giving not only an electrical insulating property but also tension and heat resistance, and further rust resistance and so on to the steel sheet.

Other than this, as a method for reducing the core loss, there is known a magnetic domain control method in which by forming grooves extending in a direction crossing a rolling direction at predetermined intervals along the rolling direction on a surface of a steel sheet, a magnetic domain is subdivided to make the movement of magnetic domain wall easy, thereby reducing the core loss.

As a method of forming the grooves on the surface of the steel sheet, a method of performing chemical etching (Patent Literature 1) and a laser irradiation method (Patent Literatures 2 to 5) and so on are known.

When the grooves are formed by the chemical etching, a cost related to equipment installation becomes huge, while the laser irradiation method makes it possible to relatively easily and stably form the grooves on the surface of the steel sheet. A method of forming the grooves by performing laser irradiation after forming an insulating film is mentioned in Patent Literatures 3 to 5.

However, in this method, a disappearance of the insulating film accompanying the formation of the grooves cannot be avoided. When the insulating film disappears, rust easily occurs. Although it is possible to improve the rust resistance by forming the insulating film after the formation of the grooves, costs increase.

CITATION LIST

Patent Literature

Patent Literature 1: Japanese Laid-open Patent Publication No. 06-100939
Patent Literature 2: Japanese Laid-open Patent Publication No. 06-57335
Patent Literature 3: Japanese Patent No. 5234222
Patent Literature 4: Japanese Laid-open Patent Publication No. 2012-177164
Patent Literature 5: Japanese Laid-open Patent Publication No. 2012-87332

SUMMARY OF INVENTION

Technical Problem

In order to avoid a disappearance of an insulating film accompanying formation of grooves, the formation of the grooves before formation of the insulating film is also considered. However, in this method, molten iron melted and scattered in a laser-irradiated portion adheres to a surface of a steel sheet around the grooves. When the molten iron adheres to the flat surface of steel sheet, projections occur there. Then, when the insulating film is formed on the steel sheet on which the projections are formed, various problems come to the insulating film. For example, when the projections are large, in some cases, the projections are exposed from the insulating film or cracking or peeling occurs in portions where the insulating film is thin around the projections (Patent Literature 2). In addition, such projections prevent close contact between grain-oriented electrical steel sheets adjacent to each other in a laminated iron core and cause a decrease in a space factor and a deterioration of a building factor, resulting in an increase in noise.

An object of the present invention is to provide a grain-oriented electrical steel sheet which is capable of improving an insulating property and rust resistance and capable of reducing a noise of a laminated iron core and in which grooves for subdividing magnetic domain are formed on a surface while avoiding a rise in costs.

Solution to Problem

A summary of the present invention is as follows.
(1)
A grain-oriented electrical steel sheet includes
a steel sheet having a surface on which grooves in which an extending direction crosses a rolling direction and a depth direction is parallel to a sheet thickness direction are formed,
wherein a molten solidified substance ranging in parallel to the groove exists on both sides of the groove on the surface of the steel sheet,
wherein a height becoming a maximum frequency in a height distribution of height data in which the surface of the steel sheet in a specific area including the groove is measured at regular intervals is set as a virtual plane, and when a space volume of recess parts recessed from the virtual plane is set as V1 and a volume of projection parts projected from the virtual plane is set as V2, a value of V2/V1 is more than 0.10 and less than 0.80,
wherein a plurality of projections are formed in the specific area, and among the plurality of projections, a width of a projection closest to the groove is larger than widths of the other projections, and
wherein when an area where an average height in the extending direction is highest in the height distribution is seen in a groove longitudinal cross section including the extending direction and the sheet thickness direction,
an average roughness Ra of a roughness curve forming a surface of the area is 0.30 to 2.00 μm, and
an average length RSm of a roughness curve element forming the surface of the area is 10 to 150 μm.
(2)
The grain-oriented electrical steel sheet according to (1),
wherein a height becoming a 0.02% th in the height data is higher than 1 μm and not higher than 10 μm.

(3)

The grain-oriented electrical steel sheet according to (1) or (2), wherein when a surface shape of the steel sheet around the groove is seen in a groove short side cross section perpendicular to a groove extending direction, among the projection parts, a distance $L_s$ between an end portion $T_{1s}$ of the projection closest to the groove and an end portion m of the groove is more than "0" (zero) μm and not more than 40 μm.

(4)

The grain-oriented electrical steel sheet according to any one of (1) to (3), wherein among the plurality of projections, a width $W_1$ of the projection closest to the groove is 40 μm or less.

(5)

The grain-oriented electrical steel sheet according to any one of (1) to (4), wherein when among the plurality of projections, $W_1$ represents a width of the projection closest to the groove and $W_n$ represents a width of a projection close to an n-th, n being an integer of 2 or more, a value of $W_n/W_1$ is more than 0.20 and less than 1.00.

(6)

The grain-oriented electrical steel sheet according to any one of (1) to (5), wherein a number of crystal grains existing at a bottom of a highest projection in a cross section perpendicular to the groove extending direction is 10.0 pieces or less on average.

(7)

The grain-oriented electrical steel sheet according to any one of (1) to (6), wherein regarding a crystal orientation of metal structure of a projection in an area where an average height in the extending direction is highest in the height distribution, an area ratio of a {110}<001> orientation is 65% or more.

(8)

The grain-oriented electrical steel sheet according to any one of (1) to (7) includes a glass film on the surface of the steel sheet including a surface of the projection parts and a surface of the grooves.

Advantageous Effects of Invention

According to the present invention, since appropriate projections are formed on the surface of the steel sheet, it is possible to improve an insulating property and rust resistance while avoiding a rise in costs in a grain-oriented electrical steel sheet in which grooves are formed on the surface.

BRIEF DESCRIPTION OF DRAWINGS

FIG. 6 is a cross-sectional schematic view in which a projection of the grain-oriented electrical steel sheet of the embodiment of the present invention is seen in a cross section including the groove extending direction Y and a sheet thickness direction Z.

DESCRIPTION OF EMBODIMENT

Figure 1A:
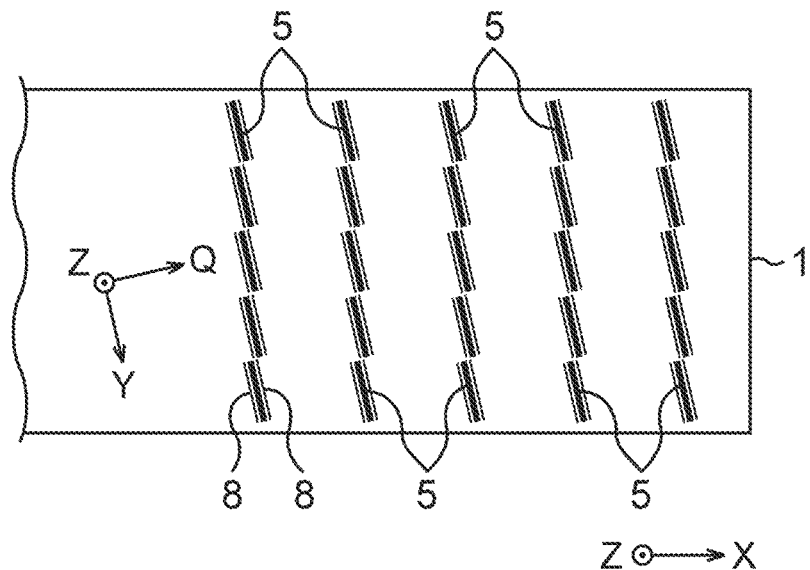
FIG. 1A is a schematic plan view illustrating a grain-oriented electrical steel sheet according to an embodiment of the present invention.

Hereinafter, an embodiment of the present invention will be explained in detail. FIG. 1A is a plan view illustrating a grain-oriented electrical steel sheet according to the embodiment of the present invention, and FIG. 1B is a cross-sectional view illustrating the grain-oriented electrical steel sheet according to the embodiment of the present invention.

Figure 1B:
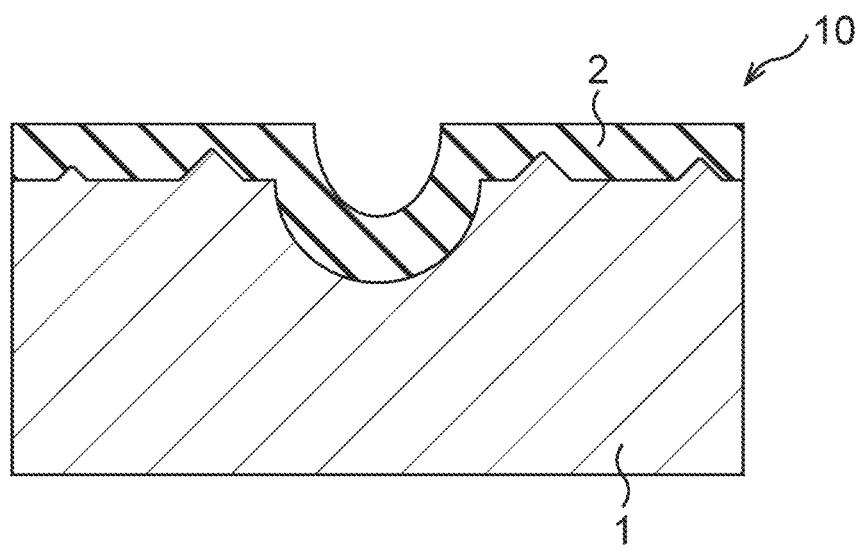
FIG. 1B is a cross-sectional schematic view illustrating the grain-oriented electrical steel sheet according to the embodiment of the present invention.

As illustrated in FIG. 1A and FIG. 1B, the grain-oriented electrical steel sheet 10 according to the embodiment of the present invention includes a steel sheet 1 provided with grooves 5 on its surface and a film 2 formed on the surface of this steel sheet 1. The film 2 is, for example, an insulating film and may contain a glass film. In FIG. 1, a rolling direction of the steel sheet 1 is defined as an X direction, an extending direction of the grooves 5 is defined as a Y direction, a sheet thickness direction of the steel sheet 1 is defined as a Z direction, and a direction orthogonal to the Y direction and the Z direction is defined as a Q direction. However, the extending direction Y of the grooves 5 is not limited to the illustrated direction, and it is sufficient that it is a direction crossing the rolling direction X.

As illustrated in FIG. 1A, on the surface of the steel sheet 1, for subdividing magnetic domain, a plurality of the grooves 5 in which the extending direction Y crosses the rolling direction X and a groove depth direction is parallel to the sheet thickness direction Z are formed at predetermined intervals along the rolling direction X. A molten solidified substance 8 ranging in parallel to the groove 5 exists on both sides of the groove 5 on the surface of the steel sheet 1. The grooves 5 need not be a liner shape, may have a curved portion, or may have an arcuate shape when they are seen from the sheet thickness direction Z, namely when the grooves 5 are seen in planar view. However, in this embodiment, for convenience of explanation, the grooves 5 having the liner shape are exemplified.

Figure 2A:
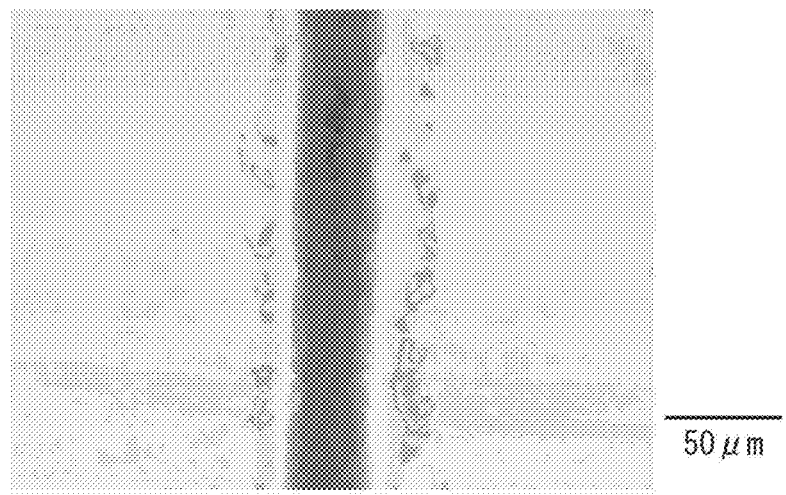
FIG. 2A is a height distribution view around a groove of a grain-oriented electrical steel sheet in an invention example.
Figure 2B:
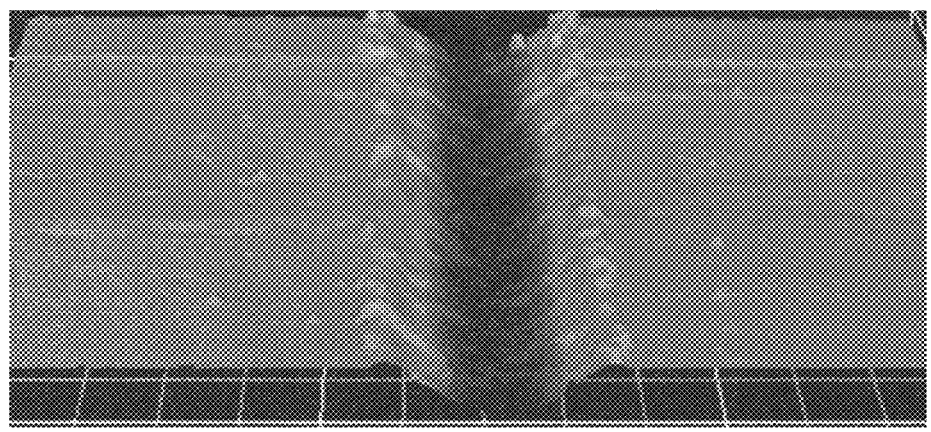
FIG. 2B is a view three-dimensionally representing FIG. 2A.
Figure 3A:
FIG. 3A is a height distribution view around a groove of a grain-oriented electrical steel sheet in a comparative example.
Figure 3B:
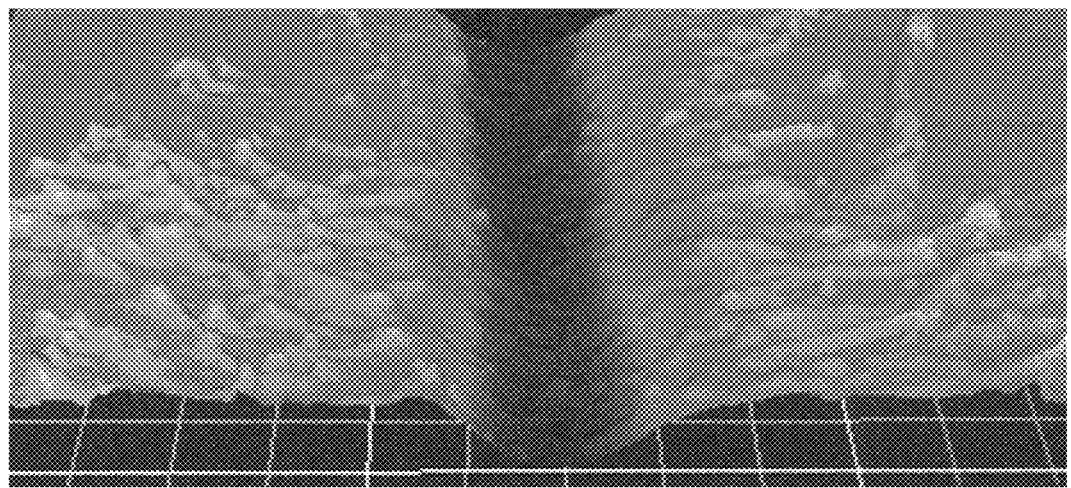
FIG. 3B is a view three-dimensionally representing FIG. 3A.

FIG. 2A and FIG. 2B each illustrate a height distribution in an area around a groove of a steel sheet included in a grain-oriented electrical steel sheet within the range of the present invention, and FIG. 3A and FIG. 3B each illustrate a height distribution in an area around a groove of a steel sheet included in a grain-oriented electrical steel sheet outside the range of the present invention. FIG. 2A and FIG. 3A illustrate the height distributions in each of which a height in the Z direction is measured by using a laser type surface roughness measuring instrument with respect to the area around the groove extending along an up-down direction in the figure. FIG. 2B and FIG. 3B illustrate the three-dimensionally represented ones. FIG. 2A and FIG. 2B illustrate an invention example corresponding to the later-described test No. 1-1, and FIG. 3A and FIG. 3B illustrate a comparative example corresponding to the later-described test No. 1-16. In the steel sheet illustrated in FIG. 2A and FIG. 2B, projection parts on the surface of the steel sheet are formed so as to be along the groove around the groove. In contrast, in the steel sheet illustrated in FIG. 3A and FIG. 3B, projection parts are irregularly formed to an area relatively far apart from the groove. Control of such projection parts will be explained further below.

Figure 4A:
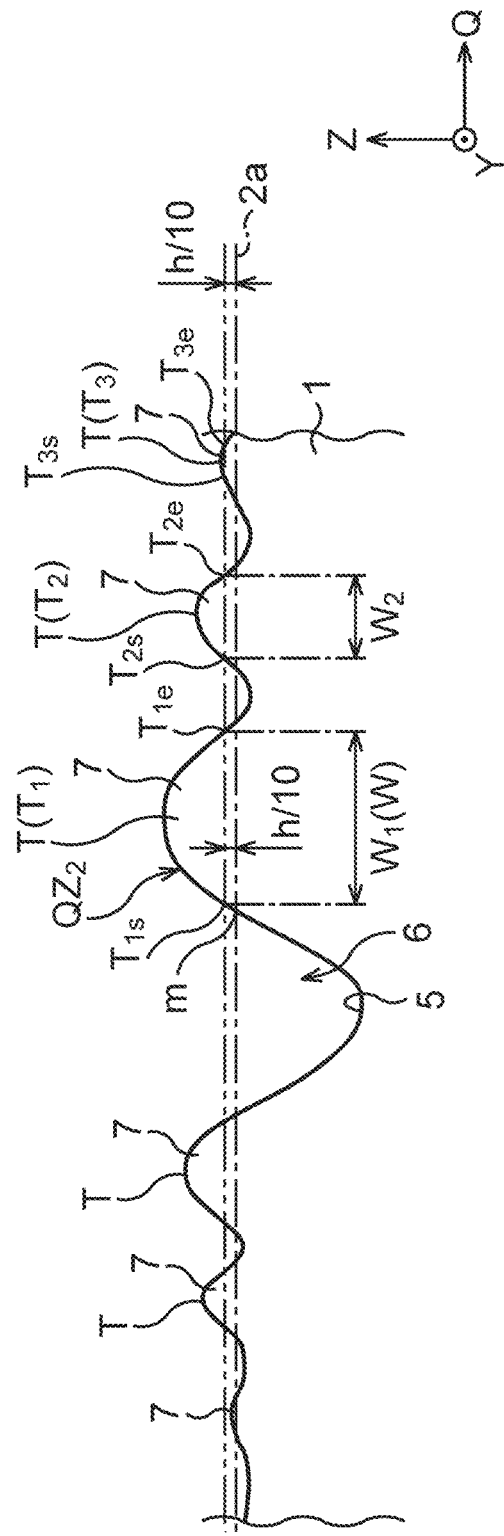
FIG. 4A is a cross-sectional schematic view in which a groove of the grain-oriented electrical steel sheet of the embodiment of the present invention is seen in a cross section orthogonal to a groove extending direction Y.
Figure 4B:
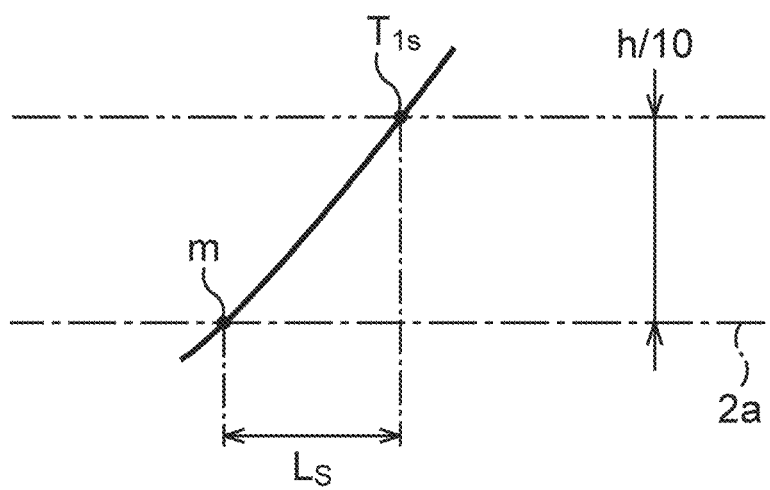
FIG. 4B is a partially enlarged view of FIG. 4A.

FIG. 4A and FIG. 4B are each a view in which one groove 5 is seen in a cross section (groove short side cross section) orthogonal to the groove extending direction Y regarding the grain-oriented electrical steel sheet of this embodiment. FIG. 4B is a partially enlarged view of FIG. 4A. A plurality of projection parts 7 are formed on the surface of steel sheet outside a groove width direction. The projection parts 7 are areas where heights in the Z direction are higher than the later-described virtual plane 2a. The projection parts 7 include not only roughness to be intentionally controlled but also areas which become higher than the virtual plane 2a due to a flaw or a very small surface variation not to be intended, a measurement error, or the like. Among the projection parts 7, the one whose height exceeds h/10 on the basis of the virtual plane 2a and whose width is h or more is defined as a projection T. h will be described later. In FIG. 4A, all of the three projection parts 7 illustrated on the right side of the groove 5 correspond to the projection T. Among the three projection parts 7 illustrated on the left side of the groove 5, the two projection parts 7 on a side close to the groove 5 correspond to the projection T, but because the projection part 7 farthest from the groove 5 is higher than the virtual plane 2a but does not exceed h/10, it does not correspond to the projection T.

FIG. 4A illustrates the groove 5 which is one of recess parts 6. The recess parts 6 are areas where heights in the Z direction are lower than the virtual plane 2a, and the recess parts 6 also include the groove 5. The recess parts 6 include not only roughness to be intentionally controlled but also areas which become lower than the virtual plane 2a due to a flaw or a very small surface variation not to be intended, a measurement error, or the like. The groove 5 is a recess part 6, for controlling magnetic domain, formed on the surface of the steel sheet 1, and can be clearly distinguished from other recess parts 6.

As illustrated in FIG. 4A, the plurality of projection parts 7 are formed on both sides of the groove 5. Among these, the projection parts 7 corresponding to the projection T are denoted by a symbol T. When the groove 5 is formed by laser irradiation, molten iron heated by a laser is discharged from the groove 5 and the molten iron is deposited and solidified on the surface of the steel sheet, thereby forming the projections T. Accordingly, the projections T are composed of steel having almost the same composition as a chemical composition of the steel sheet 1. As a matter of course, the projection parts 7 are also composed of the steel having almost the same composition as the chemical composition of the steel sheet 1. A cross-sectional contour line on the surface of the steel sheet in the cross section illustrated in FIG. 4A and FIG. 4B is referred to as a contour curve $QZ_2$ in this embodiment. The contour curve $QZ_2$ will be described later.

Figure 5:
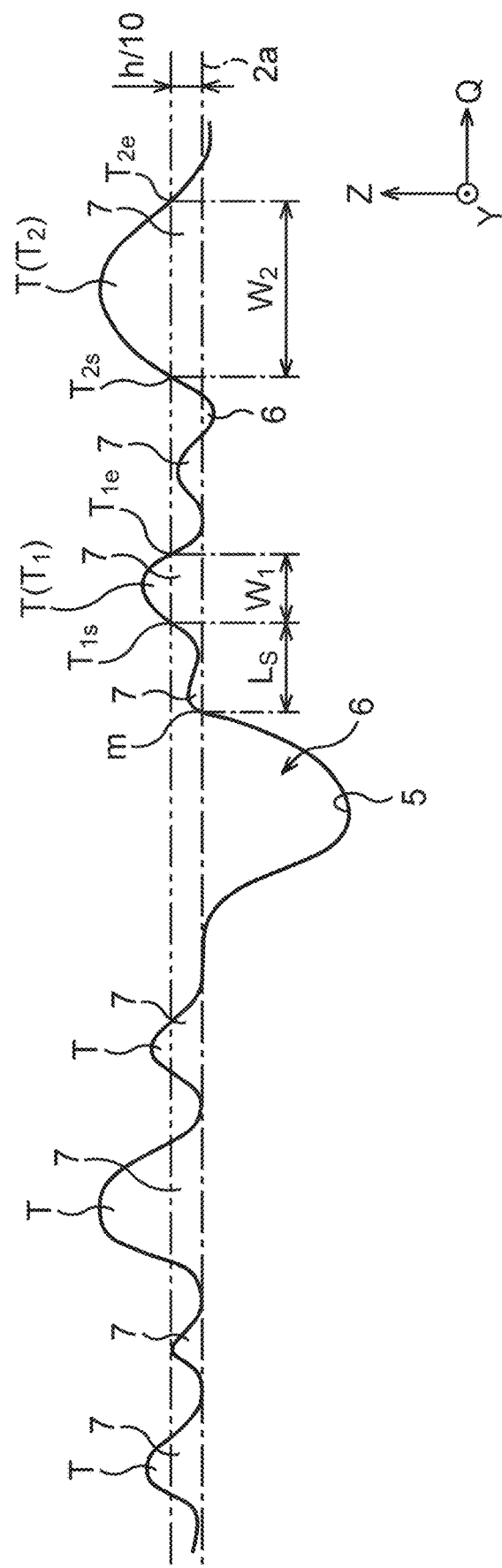
FIG. 5 is a cross-sectional schematic view in which a groove of the grain-oriented electrical steel sheet of the comparative example is seen in a cross section orthogonal to the groove extending direction Y.

FIG. 5 is a view in which one groove 5 is seen in a cross section orthogonal to the groove extending direction Y regarding the grain-oriented electrical steel sheet outside the range of the present invention. Similarly to the grain-oriented electrical steel sheet 10, a plurality of projection parts 7 are formed on a surface of a steel sheet outside a groove width direction of the groove 5, and some of them correspond to the projection T. However, in a grain-oriented electrical steel sheet 20, formation positions of the projections T are apart from the groove 5 and random compared with those in FIG. 4A and FIG. 4B. Furthermore, also regarding a distribution of sizes, the one close to the groove 5 is not large but the n-th projection $T_n$ (n is an integer of 2 or more) subsequent to the second one in a direction apart from the groove 5 sometimes becomes maximum. In more detail, in the grain-oriented electrical steel sheet 20, a width $W_2$ of the second projection $T_2$ from the groove 5 is larger than a width $W_1$ of the first projection $T_1$ from the groove. That is, a value of $W_2/W_1$ is more than 1.0. Further, a distance $L_s$ between an end portion $T_{1s}$ of the projection $T_1$ on the groove 5 side and an end portion m of the groove 5 on the projection $T_1$ side is more than 40 μm.

FIG. 6 is a view in which one projection T in the grain-oriented electrical steel sheet 10 is seen in a cross section including the groove extending direction Y and a sheet thickness direction Z. In this embodiment, a cross-sectional shape of the projection T in the cross section illustrated in FIG. 6 is referred to as a roughness curve $YZ_3$. The roughness curve $YZ_3$ will be described later.

The grain-oriented electrical steel sheet 10 has the following five configurations (A) to (E) as characteristic configurations for obtaining effect.

(A) When a space volume of the recess parts 6 is set as V1 and a volume of the projection parts 7 is set as V2 on the basis of the virtual plane 2a, a value of V2/V1 falls within a predetermined range.

(B) The width $W_1$ of the projection $T_1$ closest to the groove 5 is larger than widths of the other projections. Preferably, the heights of the projection parts 7, the distance $L_s$ of the projection $T_1$ from the groove 5, and the width $W_1$ of the projection $T_1$ each fall within a predetermined range.

(C) Values of a surface roughness parameter (Ra, RSm) indicating surface roughness of an area where an average height in the Y direction is the highest in a groove longitudinal cross section parallel to the groove extending direction and the sheet thickness direction fall within predetermined ranges.

(D) Preferably, metal structure of the respective projections T substantially corresponds with metal structure of the steel sheet 1.

(E) Preferably, also on a surface of the respective projections T and a surface of the grooves 5, a film similar to that on the surface of the steel sheet is formed.

Hereinafter, each of the above-described configurations (A) to (E) will be explained in detail.

[Regarding Configuration (A)]

In this embodiment, when a total space volume of the recess parts 6 recessed from the virtual plane 2a is set as V1 and a total volume of the projection parts 7 projected from the virtual plane 2a is set as V2, the value of V2/V1 is more than 0.10 and less than 0.80.

When the groove 5 is formed by laser irradiation in a publicly known method, metal of the irradiated portion is melted or evaporated, and part of the metal becomes liquid drops or fumes to be scattered on space, thereby vanishing from the irradiated portion, and the recess part 6 is formed. The metal removed accompanying the formation of the groove 5 adheres around the groove 5 to become the projection parts 7, thereby forming the projections T. Therefore, the value of V2/V1 does not become more than 1.0 and does not significantly drop from 1.0 either. When the groove is formed under a publicly known laser irradiation condition in order to obtain a magnetic domain control effect to a degree necessary for a practical grain-oriented electrical steel sheet, an amount of scattering space with fumes is less than 10%, and the value of V2/V1 is at most about 0.90 even though it is small, and this ratio is difficult to set to less than 0.90 by the scattering of fumes. A device of blowing a molten substance away by spraying an assist gas simultaneously with the laser irradiation is contrived, despite which this ratio is difficult to set to less than 0.85.

The groove 5 with a fixed depth and width is required in order to obtain the intended magnetic domain control effect. In other words, a fixed amount of metal is required to be removed. To allow the value of V2/V1 to be set to less than 1 means a fixed magnetic domain control effect, namely, to allow the projections T to be made relatively small when the groove 5 with the fixed depth and width is formed. Since the projections T are unfavorable to the magnetic property of the steel sheet 1 as described above, the value of V2/V1 is preferably low, and in this embodiment, it is set to less than 0.80, preferably set to less than 0.70, and further preferably set to less than 0.60. Applying the later-described manufacturing method does not make it difficult to set the value of V2/V1 to less than 0.50 and also makes it possible to set it to less than 0.40. As a result, an insulating property and rust resistance of the grain-oriented electrical steel sheet in which the grooves 5 are formed on the surface of the steel sheet 1 for subdividing the magnetic domain are improved. Meanwhile, the projections T can contribute to improvement in adhesiveness of an insulating film. When the value of V2/V1 is 0.10 or less, too small projections T do not allow sufficient adhesiveness to be obtained. Accordingly, the value of V2/V1 is more than 0.10.

[Regarding Configuration (B)]

In this embodiment, in the later-described specific area, the width $W_1$ of the projection $T_1$ closest to the groove 5 is larger than widths of the other projections. That is, in the specific area, in a direction apart to the outside in the groove width direction of the groove 5, regarding all projections $T_n$ (n is an integer of 2 or more) appearing subsequently to the second one, widths $W_n$ thereof satisfy $W_n/W_1 < 1.0$. That is, the widths $W_n$ are smaller than the width $W_1$ of the projection $T_1$. A value of $W_n/W_1$ is preferably less than 0.6, and more preferably less than 0.4. On the other hand, when a maximum value of $W_n/W_1$ is 0.2 or less, in a case of laminating a plurality of grain-oriented electrical steel sheets, a gap easily occurs between the grain-oriented electrical steel sheets piled on each other. Existence of such a gap leads to an increase in a core loss and a noise of a laminated iron core formed of the plurality of grain-oriented electrical steel sheets. Accordingly, the maximum value of $W_n/W_1$ is preferably more than 0.2. Here, an influence of the projections $T_n$ subsequent to the second one is indicated by a relationship of the width to the first projection $T_1$, and it is also natural that the projection whose width is narrow becomes small in height, and it is confirmed that a similar relationship is established also regarding the height. Note that as described later, an end point m is an intersection point of the virtual plane 2a and the contour curve $QZ_2$, and an end point $T_{1s}$ is an intersection point of the virtual plane 2a at a height of h/10 and the contour curve $QZ_2$.

In a conventional technique, as described above, since most of the metal removed from the groove 5 adheres around the groove 5 to form the projections T, the value of V2/V1 becomes about 1.0, and when it is premised that the groove 5 with necessary width and depth is formed, it is impossible to decrease a total volume of the projections T. Accordingly, it is inevitable that making the projections T low makes the widths of the projections T large. In this embodiment, the value of V2/V1 can be made as low as it is not conventionally considered, and the heights and the widths of the projections T can be independently controlled.

Further, the heights of the projection parts 7 from the virtual plane 2a are preferably higher than 1 μm and not higher than 10 μm or lower. The heights of the projection parts 7 are more preferably not higher than 6 μm, and further preferably not higher than 3 μm.

In this embodiment, in the direction (Q direction) apart to the outside in the groove width direction of the groove 5, the distance $L_s$ of the end point $T_{1s}$ of the projection $T_1$ closest to the groove 5 on the groove 5 side from the end point m of the groove 5 on the projection $T_1$ side is preferably more than "0" (zero) μm and not more than 40 μm, more preferably 0.5 to 25 μm, and further preferably 1.0 to 20 μm. In addition, the width $W_1$ of the projection $T_1$ is preferably 40 μm or less, more preferably 25 μm or less, and further preferably 15 μm or less.

The heights of the projections T are preferably low in this embodiment. In this embodiment in addition to this, by controlling the distance $L_s$ between the projection $T_1$ and the groove 5 and reducing the widths of the projections T independently, movement of a magnetic domain wall is facilitated and magnetic permeability is improved, to obtain an effect of improvement in the magnetic property of the steel sheet 1. The reason why such an effect is obtained by reducing the widths of the projections T is not clear, but the projections T are a foreign substance to the steel sheet 1 in which a crystal orientation is exquisitely controlled by secondary recrystallization, and are considered because an adverse effect of preventing the movement of the magnetic domain wall to no small extent is caused by adhering to and existing on the surface of the steel sheet. Also regarding the distance $L_s$ between the projection $T_1$ and the groove 5, the reason of affecting the movement of the magnetic domain wall is not clear, but the distance from the groove 5 being apart therefrom makes the foreign substance exists halfway through the magnetic domain wall, and it is considered because the adverse effect becomes greater than that in a situation in which the projection $T_1$ is adjacent to the groove 5 and becomes an obstacle to the movement at an end portion of the magnetic domain wall. Therefore, as long as a total length of the widths is the same regarding a plurality of projections T, the projections T preferably gather as closely as possible to the groove 5, and the widths of the projections $T_n$ subsequent to the second one are smaller than the width of the projection $T_1$ in a direction apart from the groove 5.

[Regarding Configuration (C)]

In this embodiment, when the area where the average height in the groove extending direction Y is the highest in a height distribution in a specific area is seen in a cross section (groove longitudinal cross section) including the extending direction Y and the sheet thickness direction Z, an average roughness Ra of a roughness curve forming a contour on a surface of the area is 0.3 to 2.0 μm or less, preferably 0.5 to 1.7 μm, and further preferably 0.7 to 1.4 μm, and an average length RSm of a roughness curve element is 10 to 150 μm, preferably 40 to 145 μm, and further preferably 60 to 140 μm.

That the surface roughness parameter (Ra, RSm) falls within the above-described ranges means that variations in the height in the extending direction Y in the area are small. Accordingly, as long as the surface roughness parameter (Ra, RSm) falls within the above-described ranges, film breakage due to stress concentration on the film is avoided, and at the same time the insulating property is also improved because a height of a maximum height portion of the projections T in which the insulating property is difficult to secure becomes low. Furthermore, because variations in the widths of the projections T also become small, a maximum width of projection widths which are expected to rate-determine an obstacle effect to the movement of the magnetic domain wall becomes small, resulting in the improvement in the magnetic property.

[Regarding Configuration (D)]

In this embodiment, a desirable effect can be obtained by controlling the metal structure of the projections T. As described above, the metal removed accompanying the formation of the groove 5 adheres around the groove 5 to thereby form most of the projections T. When the groove 5 is formed by the laser irradiation, the metal removed from a portion intended to form the groove 5 on the steel sheet 1 is melted, and when this metal adheres to the surface of the steel sheet and is cooled rapidly, it becomes an undesirable molten solidified substance for the magnetic property, and crystal grains contained in the molten solidified substance become fine. In addition, a crystal orientation of the crystal grains forming the molten solidified substance is highly likely to deviate from a {110}<001> orientation, and a desirable magnetic property is highly likely not to be obtained. These are one factor in preventing the above-described movement of the magnetic domain wall, but as long as it becomes possible to make the metal structure of the projections T close to the metal structure of the steel sheet 1, the adverse effect as the obstacle to the movement of the magnetic domain wall can be reduced.

It is basically effective to make a crystal grain diameter of the projections T large. The steel sheet 1 constituting the grain-oriented electrical steel sheet 10 is formed of crystal grains in a unit of several tens of mm. Accordingly, also in a size of crystal grains forming the projections T, considering a size in the groove extending direction Y, it is also possible to make the crystal grains in the projections T along the groove 5 to be formed in a length of several mm to several tens of mm grow to almost the same size as that in the extending direction. However, sizes of the projection T in the Z direction and the Q direction being about several μm, it is thought difficult to properly prescribe the crystal grains having large anisotropy in which a size in the Y direction becomes as large as several tens of mm by the crystal grain diameter which is premised on being generally isotropic. Furthermore, because the sizes of the projections T themselves vary in a wide range, a uniform prescription by the crystal grain diameter is also considered not to be appropriate. Therefore, in this embodiment, a degree of growth of the crystal grains in the projections is judged by the average number of crystal grains in the metal structure of the projections T when the projections are observed in a cross section (groove short side cross section) perpendicular to the groove extending direction Y. The structure to be obtained by rapid cooling and solidification of molten iron scattered at a time of formation of the groove 5 in a conventional method is formed of very fine crystal grains. Then, the number of crystal grains at the bottom of the projections T is as many as several tens of pieces in the groove short side cross section. When the projections T are formed of such fine crystal grains, crystal grains deviating from the {110}<001> orientation are contained in large quantity. On the other hand, applying the later-described manufacturing method makes it possible to form the projections T of coarse crystal grains and set the number of crystal grains existing at the bottom of the highest projection T in the groove short side cross section to 10.0 pieces or less on average. A method of measuring the number of crystal grains is described later, but when an average value of the number of crystal grains is more than 10.0, many crystal grains deviating from the {110}<001> orientation are sometimes contained. Accordingly, the average number of crystal grains is preferably 10.0 pieces or less, more preferably 5.0 pieces or less, and further preferably 3.0 pieces or less. The projections T are most preferably each formed of a single crystal grain.

Further, the adverse effect of the projections T as the obstacle to the movement of the magnetic domain wall is considered to also depend on the crystal orientation thereof. As long as the crystal orientation of the projections T is the same crystal orientation continuous from the steel sheet 1, the obstacle effect to the movement of the magnetic domain wall can be reduced as much as possible. Because what is called a Goss orientation is grown large in the secondary recrystallization in the steel sheet 1, forming the grooves 5 and the projections T in a process previous to this allows an encroachment of the projections T in the Goss orientation growing from the steel sheet 1 side in a process of the secondary recrystallization and makes it possible to set the crystal orientation of the projections T to the desirable one.

[Regarding Configuration (E)]

FIG. 4A, FIG. 4B, and FIG. 6 each exemplify a state in which no film exists on the surface of the steel sheet including the surface of the groove 5 and the projections T, but in the grain-oriented electrical steel sheet of this embodiment, the surface of the recess parts 6 and the projection parts 7 may be covered with a glass film. Being a form of interposing the glass film between the insulating film and the steel sheet 1 in particular makes it possible to secure the adhesiveness between the steel sheet 1 and the insulating film and allows the improvement in the rust resistance and the insulating property. In a process of forming the grooves by the laser irradiation after formation of the insulating film, the insulating film and the glass film in the grooves 5 are made to disappear. In order to secure the rust resistance and the insulating property, the insulating film is re-formed after the formation of the grooves, but in this case, because the insulating film directly comes in contact with the steel sheet on a surface of the grooves 5, sufficient adhesiveness of the insulating film sometimes cannot be secured.

Although details are described later, it is possible to form the grooves 5 and the projections T before coating of an annealing separating agent for formation of the glass film and perform finish annealing in a state of coating the annealing separating agent also on the surface of the grooves 5 and the surface of the projections T and to thereby form the glass film also on an inner surface of the grooves 5 and the surface of the projections T. The glass film need not be a special one, and for example, films in which a thickness of the glass film is more than "0" (zero) μm and not more than 5 μm and a thickness of the insulating film is 1 to 5 μm are applicable. Further, what is called a glass-less film which has no glass film and in which the insulating film is disposed on the steel sheet 1 so as to secure the adhesiveness can also be applied. Note that these films need not each have the same thickness on the surface of the grooves 5, the surface of the projections T, and a flat portion (in steel sheet, the surface corresponding with the later-described virtual plane). Because these films are each formed by coating, drying, and baking a liquid-state substance on the surface of the steel sheet, changes in the thickness are natural for the grooves 5 and the projections T which are irregularities on the surface. These changes in the thickness are not the ones by which the effect of the present invention is lost.

As described above, since being the form having the glass film and the insulating film makes it more difficult that cracking and peeling of the films around the grooves 5 and around the projections T occur, more excellent adhesiveness of the insulating film can be obtained.

Incidentally, in the explanation of the above-described configurations (A) to (E), the space volume V1 of the recess parts 6, the volume V2 of the projection parts 7, the heights of the projection parts 7 and the projections T, the widths W of the projections T, the distance $L_s$ between the projection $T_1$ and the groove 5, the crystal grain diameter of the metal structure in the projections T, and so on have been explained with characteristics in one specific cross section in mind for convenience. However, as illustrated in FIG. 6, in the extending direction (Y direction) of the groove 5, a shape of the projection T is not necessarily fixed. Similarly, the widths W of the projections T, and the crystal grain diameter and a crystal orientation distribution of the metal structure of the projections T also vary greatly depending on cross sections to be observed. Therefore, hereinafter, a specifying method of a quantitative value related to a shape on the surface of the steel sheet in the present invention will be explained.

Note that values related to various shapes on the surface of the steel sheet to be prescribed in the present invention are to be specified by the surface of the steel sheet 1 without considering films on the surface of the grain-oriented electrical steel sheet. That is, a prescription related to the shape in the present invention is the one regarding the steel sheet 1 except the films, and regarding the grain-oriented electrical steel sheet having the films, the surface of the steel sheet 1 is to be measured by cross-section observations or the steel sheet 1 after peeling the films is to be measured. In order to simply obtain measured values necessary in the present invention, a method of three-dimensionally measuring the shape on the surface of the steel sheet 1 in a state in which there is no film is more suitable than a method of specifying the surface of the steel sheet 1 by the cross-section observations and obtaining the necessary measured values based on the above. Hereinafter, the method will be explained.

In the present invention, Z-direction positions in a sufficiently wide range on the surface of the steel sheet, including the groove 5 and the projections T, are measured by using the laser type surface roughness measuring instrument. In the present invention, in consideration of the sizes of the projections T, the irregularities on the surface, and formation positions to control, a range of 1000 μm across in the extending direction Y of the groove 5 and a range of 400 μm (200 μm on one side of the groove) in the Q direction with the groove centered are set as a specific area, and the Z-direction positions on the surface of the steel sheet 1 are measured at regular intervals in this specific area to obtain a height distribution of height data. In this measurement, a laser spot diameter is set to 0.40 μm or less (for example, 0.40 μm), and a scan is performed in steps of 0.30 μm or less (for example, 0.15 μm) in the Y direction and the scan is performed in steps of 0.30 μm or less (for example, 0.15 μm) in the Q direction, and measurement accuracy in the Z direction is set to 0.10 μm or less (for example, 0.10 μm) and a magnification of an objective lens is set to 50 times.

Though depending on the scan step, thus, surface shape data made up of ten million points or more in total is obtained from the entire area of the specific area. Then, the data is compiled as a frequency distribution for each Z-direction height. Then, the height in which a frequency becomes maximum is prescribed as the virtual plane 2a and considered as an ideal reference plane corresponding with the surface of the steel sheet before forming the groove 5 and the projections T, and the Z-direction height is set to zero. A width of the groove 5 to become a recessed area as the Z-direction height is about 20 μm, and further, areas in which metal scattered from this area is deposited on the surface of the steel sheet to become the projections T do not spread thin on the entire surface either but are local in consideration of a wide area of about 400 μm near the groove 5, and furthermore, even though there are some irregularities on a surface of a flat portion of the original steel sheet 1, it is considered proper to specify the virtual plane 2a to be regarded as the surface of the original steel sheet (the height in the Z direction is zero) by the above-described frequency.

It is assumed that this virtual plane 2a is an extending plane in an area where the groove 5 and the projections T exist. In each of FIG. 4A, FIG. 4B, and FIG. 6, the virtual plane 2a determined as described above is drawn by a dot and dash line. As long as such a plane is determined, the space volume V1 in which the metal is removed as the groove 5 can be specified by summing a product of a step width and a Z-direction height regarding a measurement point where the Z-direction height becomes a negative value. Similarly, the volume V2 in which the molten iron is discharged from the surface of the steel sheet as the projections T to become the projection parts 7 can be specified by summing a product of a step width and a Z-direction height regarding measurement points where the Z-direction height becomes a positive value.

"h" related to heights of the projection parts 7 is specified as a height ranked 0.02% of the total by putting the above-described surface shape data in descending order of the Z-direction height. For example, in a case of ten million-point data, a height of a measurement point in the 2000th height is set to h.

Actual heights of the projection parts 7 are considered to be various heights from higher than "0" (zero), but a degree of sizes of the projection parts 7 is indicated by h in the present invention. The height to become h is considered to become a value corresponding to a height of the projection part 7 whose height is relatively high among the projection parts 7 existing in large numbers, and such evaluation is considered proper, considering that focused properties, namely the insulating property, the rust resistance, the magnetic property, and so on are strongly affected by the projection part 7 whose height is relatively high.

In order to specify other prescribed values in the present invention, curves representing the surface of the steel sheet in a Y-direction vertical section (groove short side cross section) and a Q-direction vertical section (groove longitudinal cross section) are used. First, the following will explain how to find these curves.

In the above-described surface shape data, profile curves $QZ_1$ representing changes in the heights are obtained in a series of data in which Y-direction positions are the same as each other, namely height data in specific Q-Z cross sections. A contour curve $QZ_2$ (FIG. 4A) forming an average contour in the Q direction is obtained by averaging these profile curves $QZ_1$ regarding all the Y-direction positions.

Similarly, in the above-described surface shape data, profile curves $YZ_1$ representing changes in the heights are obtained in a series of data in which Q-direction positions are the same as each other, namely height data in specific Y-Z cross sections. Furthermore, an average Za of the heights is found regarding each of profile curves $YZ_1$ in specific Q-direction positions. Among the profile curves $YZ_1$, the profile curve whose average Za becomes maximum is a contour curve $YZ_2$. The contour curve $YZ_2$ corresponds to a contour curve in an area where the average height in the extending direction Y is the highest in the height distribution.

As can be seen from the above-described definition, a position in the Q direction where the contour curve $YZ_2$ is obtained corresponds with a position where a Z-direction height becomes the highest in the contour curve $QZ_2$. Then, this position is normally a position of a top portion of the later-described projection $T_1$. A roughness curve $YZ_3$ (FIG. 6) is obtained by applying a low-pass filter with a cutoff value λs and a high-pass filter with a cutoff value λc to the contour curve $YZ_2$.

The cutoff values λs and λc are determined by a model and an objective lens of the laser type surface roughness measuring instrument. In the present invention, as the cutoff values in setting a magnification of the objective lens to 50 times and measuring the roughness with VK-9700 manufactured by KEYENCE CORPORATION, λs=0.8 μm, λc=0.08 mm are used.

Next, steps to specify the prescribed values to be used in the present invention from these curves will be explained.

The prescribed value related to the widths of the projections T and the distance from the groove 5 is specified from the contour curve $QZ_2$.

A point at which the contour curve $QZ_2$ crosses the virtual plane 2a at first in a direction apart from the middle of the Q direction, namely the middle portion of the groove 5 is set to a groove end point m. The projections T are prescribed in an area apart from the groove further from the groove end point m. In this prescription, the projection T is an area where a height of the contour curve $QZ_2$ is in a position higher than a height of h/10 and a distance in the Q direction in which the height of the contour curve $QZ_2$ continues at h/10 or higher is equal to or more than h. The reason why the projection T is specified by such a prescription is that irregularities different from irregularities to intentionally control in order to obtain the effect of the present invention exist on the surface of the steel sheet 1 and these irregularities not to be intended are excepted from the projection to prescribe in the present invention. The irregularities to except are considered to be very small irregularities (roughness) appearing by rolling or the like, to be a numeric value change caused from the measurement error, and the like. Because these are very fine according to existing industrial manufacturing techniques and measurement accuracy, a considerable portion of these is considered to disappear by processing for obtaining the contour curve $QZ_2$ by averaging the contour curves $QZ_1$ which are raw data regarding the Y-direction positions as described above, but the irregularities which are relatively small height or width compared with the height h are excepted from an evaluation object further as described above.

In the present invention, in a direction apart to the outside of the groove 5 in the Q direction from the groove end point m, the projections are numbered in order from the one close to the groove. In the n-th projection $T_n$, a position of an end point of the projection $T_n$ on a side close to the groove is set to $T_{ns}$, a position of an end point thereof on a side far from the groove is set to $T_{ne}$, and a distance between $T_{ns}$ and $T_{ne}$ is a width $W_n$ of the projection $T_n$. Each of the end points $T_{ns}$ and $T_{ne}$ is an intersection point of the virtual plane at the height of h/10 and the contour curve $QZ_2$. In the present invention, a width of the projection $T_1$ closest to the groove is set to $W_1$. In addition, regarding the projection $T_1$ closest to the groove 5, the distance between the groove end point m and $T_{1s}$ is $L_s$.

From the roughness curve $YZ_3$, the average roughness Ra and the average length RSm of the roughness curve element of the projection T having the highest average height in the Y direction are found. The average roughness Ra and the average length RSm of the roughness curve element are determined in accordance with Japan Industrial Standard JIS B 0601 (2013).

Figure 7A:
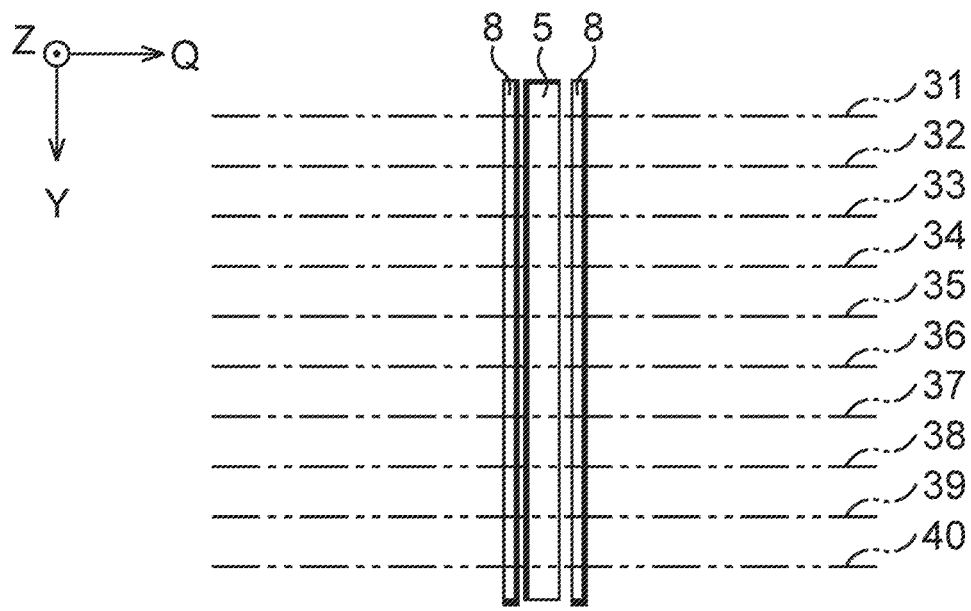
FIG. 7A is a view illustrating positions for measuring the number of crystal grains.
Figure 7B:
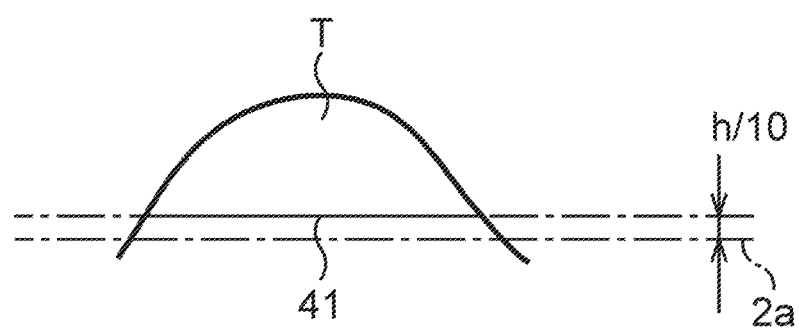
FIG. 7B is a view illustrating a line segment for measuring the number of crystal grains.

The average number of crystal grains forming the projections T is found from the cross section (groove short side cross section, Q-Z plane) perpendicular to the groove extending direction Y. In the present invention, as illustrated in FIG. 7A, the metal structure in the groove short side cross section is observed at ten observation points 31 to 40 in the Y direction, and the number of crystal grains existing at the bottom of the highest projection T is found at each of the observation points 31 to 40. That is, as illustrated in FIG. 7B, the number of crystal grains existing on a line segment 41 at h/10 in the Z-direction height of the projection T in the groove short side cross section is found. Then, the average value of the number of crystal grains at each of the observation points 31 to 40 is calculated. Although a device for observing the metal structure of the steel sheet 1 is enabled by a publicly known device, a size of the projections in the groove short side cross section is several μm, and therefore an observation with a scanning electron microscope (SEM) is preferable.

Further, the crystal orientation in the projections T is determined by observing the metal structure in the cross section in which the contour curve $YZ_2$ is obtained. The crystal orientation is found while being careful in being limited to an area corresponding to the projections T, namely only an area where the Z-direction height is at h/10 in the cross-sectional structure. In the crystal orientation, an area ratio of the {110}<001> orientation in the corresponding area is found by an electron back scattering diffraction pattern (EBSD) method.

Measurement conditions of EBSD are as follows.

(a) a measuring apparatus: a scanning electron microscope with electron back scattering diffraction device (SEM-EBSD)
(model number of SEM "JSM-6400" (manufactured by JEOL Ltd.))
(b) a beam diameter: 0.5 μm
(C) a step interval: 0.1 μm
(d) a magnification: 100 times
(e) a measurement area: 1000 μm in the Y direction in the cross section in which the contour curve $YZ_2$ is obtained Regarding the area corresponding to the projections T which is measured under the above conditions, an area ratio of an area having the {110}<001> (±10°) orientation is set to be the area ratio in the present invention. The area ratio is preferably 65% or more in that the magnetic property can be improved. That is, regarding the crystal orientation of the metal structure of the projection T in the area where the average height in the groove extending direction Y is the highest in the height distribution, the area ratio of the {110}<001> orientation is preferably 65% or more.

Note that measuring only the area on one side of the groove 5 suffices for the above measurement regarding the projections T. The above-described numeric value regarding the projections T is likely to be equivalent on both sides of the groove 5, and further, even though there is a deviation, satisfying the conditions on one side is because the effect of the present invention can be obtained.

Regarding the groove extending direction, the above-described prescribed value of the projections T is measured near the middle of the extending direction. This is because on end sides of the extending groove 5, due to a change in laser irradiation angle, the closer to the end sides of the extending groove 5, the shallower the depth of the groove 5 becomes and the larger a change in shape of the projections T also becomes.

Further, in the present invention, because the groove 5 need not be linear, in measurement of a surface height Z by using the above-described three-dimensional roughness gage, a direction of the 1000 μm length in the measurement area is also considered not to exactly correspond with the Y direction. However, even the groove 5 formed in a curved shape is allowed to be substantially linear as long as the groove 5 manufactured in a practical range as an industrial product has a distance of about 1000 μm, and in the present invention, the characteristic is prescribed as described above.

Further, variations in the plurality of grooves 5 are in a range of manufacturing variations in industrial products and need not be particularly taken into account regarding a judgment by abnormal values, or the like. In the prescription in the present invention, a value averaged regarding a length of 1 mm across in the extending direction is used, and a representative value can be obtained to a degree to which there is no problem regarding the variation for each of the individual grooves 5.

Note that the projections 5 prescribed in the present invention are a surface shape of the steel sheet 1. That is, they are not a shape from the top of the film of the grain-oriented electrical steel sheet having the film. This allows visual measurement as long as a cross-section observation is performed even though the film is formed on the surface of the steel sheet 1. However, in order to quantify various values, measuring the surface shape by using the three-dimensional roughness measuring device as described above is good for operationality, and this case requires that the surface of the steel sheet 1 be measured in a state of no film. That is, as long as the grooves 5 and the projections T are formed before forming the film, it is sufficient to measure the surface shape immediately after the formation of the grooves and the projections or before the film formation. Further, as long as the surface shape is measured after the film formation, the glass film and the insulating film of the grain-oriented electrical steel sheet are removed by, for example, the following method, thereby allowing the measurement.

The grain-oriented electrical steel sheet having the glass film or the insulating film is immersed in a sodium hydroxide aqueous solution of NaOH: 10 mass %+$H_2O$: 90 mass % at 80° C. for 15 minutes. Next, it is immersed in a sulfuric acid aqueous solution of $H_2SO_4$: 10 mass %+$H_2O$: 90 mass % at 80° C. for 3 minutes. Thereafter, it is immersed in a nitric acid aqueous solution of $HNO_3$: 10 mass %+$H_2O$: 90 mass % at normal temperature for a little less than 1 minute to be washed. Lastly, it is dried by a hot air blower for a little less than 1 minute.

Note that when the glass film or the insulating film is removed from the grain-oriented electrical steel sheet by the above-described method, the shape and the roughness of the grooves 5 of the steel sheet 1 are confirmed to be equal to those before forming the glass film or the insulating film. Furthermore, when the grooves 5 formed halfway through a steel sheet manufacturing process undergo large deformation such as cold rolling thereafter, their shape changes greatly, but annealing, film formation, and so on, are confirmed to make the change in their shape small even though the above processes are passed. In the present invention, the prescription regarding the projections T applies to a final product, and when the film is formed on a surface of the final product, it applies to the steel sheet 1 from which the film has been peeled.

Regarding a chemical composition, the steel sheet 1 contains, for example, in mass %, Si: 0.8 to 7%, C: more than "0" (zero) % and not more than 0.085%, acid-soluble Al: "0" (zero) to 0.065%, N: "0" (zero) to 0.012%, Mn: "0" (zero) to 1%, Cr: "0" (zero) to 0.3%, Cu: "0" (zero) to 0.4%, P: "0" (zero) to 0.5%, Sn: "0" (zero) to 0.3%, Sb: "0" (zero) to 0.3%, Ni: "0" (zero) to 1%, S: "0" (zero) to 0.015%, Se: "0" (zero) to 0.015%, and the balance consists of Fe and impurities.

The chemical composition of the steel sheet 1 is a desirable chemical composition for controlling the crystal orientation to Goss aggregate structure aggregated in the {110}<001> orientation. Among the above-described elements, Si and C are essential elements, and acid-soluble Al, N, Mn, Cr, Cu, P, Sn, Sb, Ni, S, and Se are selected elements. Because it is sufficient that the above-described selected elements are contained in response to the purpose thereof, a lower limit value need not be limited, and the lower limit value may be "0" (zero) %. Further, the selected elements are not limited to the above-described elements, and even though a publicly known element having a publicly known effect is contained in a publicly known range in the grain-oriented electrical steel sheet, the effect of this embodiment is not impaired. For example, the balance of the essential elements and the selected elements of the steel sheet 1 consists of Fe and the impurities. The impurities mean an ore or scrap as raw material, or elements to be inevitably mixed due to a manufacturing environment or the like when the steel sheet 1 is industrially manufactured.

In addition, in general, the grain-oriented electrical steel sheet undergoes purification annealing at a time of the secondary recrystallization. A discharge of inhibitor-forming elements outside the system occurs in the purification annealing. Regarding N and S in particular, a reduction in concentration is significant, and their concentrations become 50 ppm or less. In normal purification annealing conditions, in the concentration, N and S each reach 9 ppm or less, furthermore 6 ppm or less, and performing sufficient purification annealing makes their concentrations reach a degree (1 ppm or less) which cannot be detected by general analysis.

It is sufficient that the chemical composition of the steel sheet 1 is measured by a general analytical method for steel. For example, it is sufficient that the chemical composition of the steel sheet 1 is measured by using ICP-AES (Inductively Coupled Plasma-Atomic Emission Spectrometry). Specifically, it can be specified by measuring a 35 mm square test piece of the steel sheet 1 after film removal under the condition based on a previously created calibration curve by using ICPS-8100 manufactured by Shimadzu Corporation or the like (measuring apparatus). Note that it is sufficient that C and S are measured by using a combustion-infrared absorption method and N is measured by using an inert gas fusion-thermal conductivity method.

As described above, according to this embodiment, it is possible to significantly improve the rust resistance and the insulating property and further the magnetic property of the grain-oriented electrical steel sheet in which the grooves 5 and the projections T are formed on the surface of the steel sheet for subdividing the magnetic domain.

Figure 8:
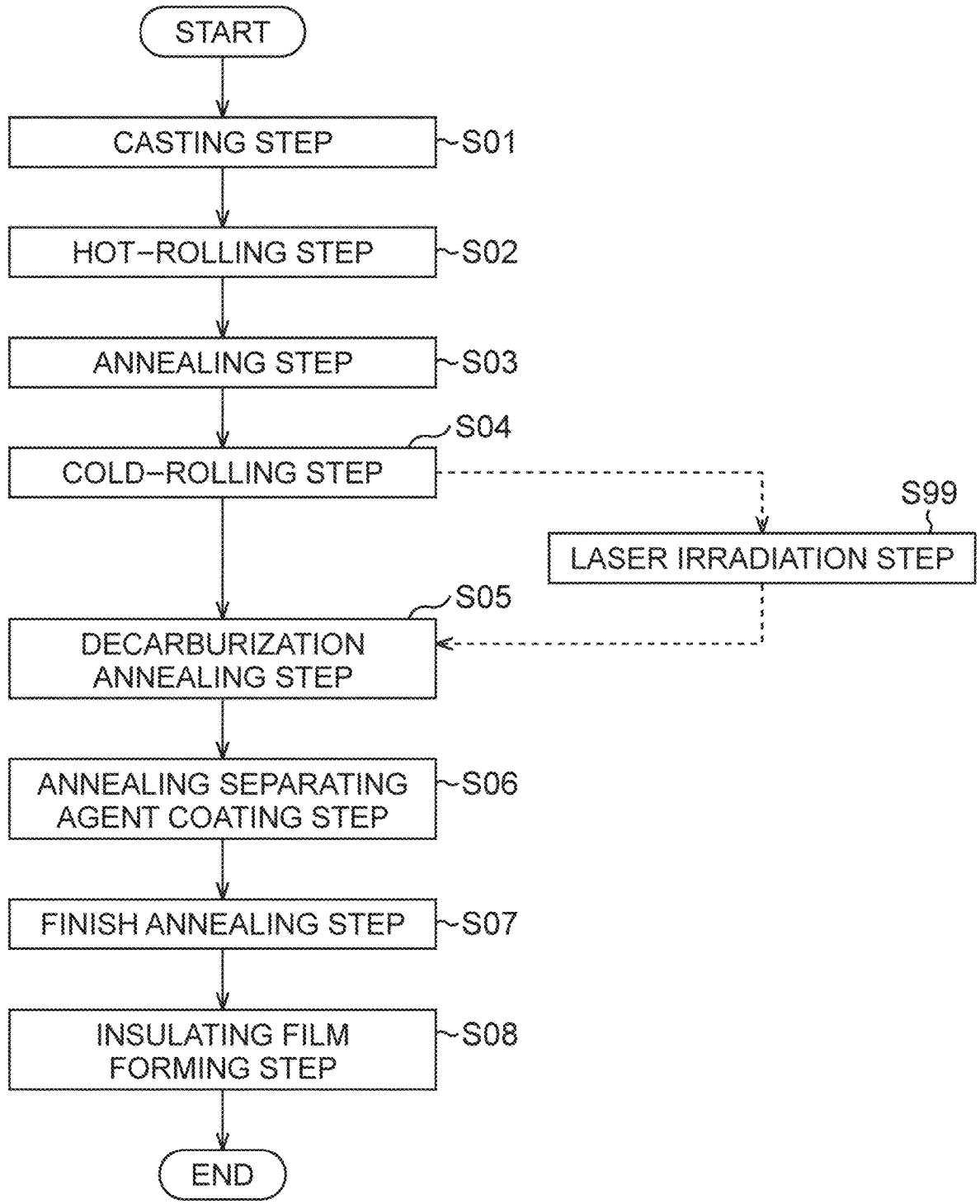
FIG. 8 is a process chart explaining a manufacturing method of the grain-oriented electrical steel sheet of the embodiment of the present invention.

Next, a manufacturing method of the grain-oriented electrical steel sheet according to the embodiment of the present invention will be explained. FIG. 8 is a flowchart illustrating the manufacturing method of the grain-oriented electrical steel sheet according to the embodiment of the present invention. This manufacturing method includes a casting step S01, a hot-rolling step S02, an annealing step S03, a cold-rolling step S04, a decarburization annealing step S05, an annealing separating agent coating step S06, a finish annealing step S07, an insulating film forming step S08, and a laser irradiation step S99 as illustrated in FIG. 8. A point of this manufacturing method is a groove forming (projection forming) step by the laser irradiation, and this step can be performed at a plurality of pieces of timing in a steel sheet manufacturing process across many steps. Therefore, in the following explanation, first, the manufacturing method of a general grain-oriented electrical steel sheet will be explained, and thereafter the laser irradiation step S99 in which the grooves and the projections are formed will be explained.

In the casting step S01, for example, molten steel having the chemical composition which contains, in mass %, Si: 0.8 to 7%, C: more than "0" (zero) % and not more than 0.085%, acid-soluble Al: "0" (zero) to 0.065%, N: "0" (zero) to 0.012%, Mn: "0" (zero) to 1%, Cr: "O" (zero) to 0.3%, Cu: "0" (zero) to 0.4%, P: "0" (zero) to 0.5%, Sn: "0" (zero) to 0.3%, Sb: "0" (zero) to 0.3%, Ni: "0" (zero) to 1%, S: "0" (zero) to 0.015%, and Se: "0" (zero) to 0.015% and in which the balance consists of Fe and impurities is supplied in a continuous casting machine, and a slab is continuously produced.

Sequentially, in the hot-rolling step S02, after the slab obtained in the casting step S01 is heated to a predetermined temperature (for example, 1150 to 1400° C.), hot rolling is performed. Thus, for example, a hot-rolled steel sheet having a thickness of 1.8 to 3.5 mm is obtained.

Sequentially, in the annealing step S03, with respect to the hot-rolled steel sheet obtained in the hot-rolling step S02, annealing is performed under a predetermined temperature condition (for example, a condition that it is heated at 750 to 1200° C. for 30 seconds to 10 minutes). Sequentially, in the cold-rolling step S04, after pickling the hot-rolled steel sheet subjected to the annealing treatment in the annealing step S03, cold rolling is performed. Thus, for example, a cold-rolled steel sheet having a thickness of 0.15 to 0.35 mm is obtained.

Sequentially, in the decarburization annealing step S05, with respect to the cold-rolled steel sheet obtained from the cold-rolling step S04, heat treatment (namely, decarburization annealing treatment) under a predetermined condition (for example, heating at 700 to 900° C. for 1 to 3 minutes) is performed. Performing such decarburization annealing treatment reduces carbon to equal to or less than a predetermined amount to form primary recrystallization structure in the cold-rolled steel sheet. In the decarburization annealing step S05, on a surface of the cold-rolled steel sheet, an oxide layer containing silica ($SiO_2$) as a main component is formed. Further, an inhibitor in the secondary recrystallization of the grain-oriented electrical steel sheet may be formed in nitridation annealing following the decarburization annealing. As long as this technique is applied, the nitridation annealing is performed subsequently to the decarburization annealing step S05. Here, such nitridation annealing will also be explained including the decarburization annealing step S05.

Sequentially, in the annealing separating agent coating step S06, an annealing separating agent containing magnesia (MgO) as a main component is coated on a surface of the cold-rolled steel sheet (a surface of the oxide layer). Sequentially, in the finish annealing step S07, with respect to the cold-rolled steel sheet on which the annealing separating agent has been coated, heat treatment (namely, finish annealing treatment) under a predetermined condition (for example, heating at 1100 to 1300° C. for 20 to 24 hours) is performed. Performing such finish annealing treatment causes the secondary recrystallization in the cold-rolled steel sheet and purifies the cold-rolled steel sheet. As a result, the cold-rolled steel sheet which has the above-described chemical composition of the steel sheet 1 and in which the crystal orientation is controlled so that an axis of easy magnetization of crystal grains and the rolling direction X correspond with each other is obtained.

Further, when the finish annealing treatment as described above is performed, the oxide layer containing silica as the main component reacts with the annealing separating agent containing magnesia as the main component, and the glass film containing a composite oxide such as, for example, forsterite ($Mg_2SiO_4$), spinel ($MgAl_2O_4$), or cordierite ($Mg_2Al_4Si_5O_{16}$) is formed on the surface of the cold-rolled steel sheet. In the finish annealing step S07, the finish annealing treatment is performed in the state in which the cold-rolled steel sheet is wound in a coil shape. Forming the glass film on the surface of the cold-rolled steel sheet during the finish annealing treatment makes it possible to prevent seizing of the cold-rolled steel sheet wound in a coil shape.

Sequentially, in the insulating film forming step S08, an insulating coating solution containing, for example, colloidal silica and phosphate is coated from the top of the glass film. Thereafter, baking heat treatment is performed under a predetermined temperature condition (for example, 840 to 920° C.).

Next, the laser irradiation step S99 will be explained. Although the laser irradiation step S99 can be performed at any timing subsequently to the casting step S01, performing the hot rolling, the pickling, and the cold rolling thereafter makes the grooves 5 and the projections T of at most about several hundreds μm as a change in the surface shape almost disappear. Therefore, it is to be performed at least after the cold-rolling step S04. First, characteristics which appear depending on performance timing of the laser irradiation step S99 will be explained.

When the laser irradiation step S99 is performed between the cold-rolling step S04 and the decarburization annealing step S05, a rolling oil existing on the surface of the steel sheet in a state of remaining rolled acts effectively on shape control of the surface of the steel sheet, and the oxide layer containing silica ($SiO_2$) to be produced during the decarburization annealing step as the main component is formed also on the surface of the grooves 5 and the projections T. This is advantageous to formation of a good glass film in the final product. Further, grain growth of the projections, which does not reach the flat portion of the steel sheet, occurs in the decarburization annealing step to adjust the grain diameter, and therefore an encroachment by secondary recrystallized crystal grains from the steel sheet in the finish annealing also easily occurs.

In a case of a process of employing nitridation annealing, the laser irradiation step S99 can be performed halfway through the decarburization annealing step S05. Because performing the laser irradiation before the nitridation annealing makes both a surface layer area of the grooves 5 and an area of the projections T into structure subjected to inhibitor control by nitridation, the crystal orientation is expected to be preferably controlled by the secondary recrystallization thereafter also regarding these areas. However, in general, the nitridation annealing is performed without decreasing a steel sheet temperature after the decarburization annealing, and is thereby performed so as to avoid an increase in energy costs. Because performing the laser irradiation halfway through this also causes a need to cool the steel sheet once and reheat it for the nitridation after the laser irradiation, this point is to be considered regarding consciously performing at this timing.

When the laser irradiation step S99 is performed between the decarburization annealing step S05 and the annealing separating agent coating step S06, it becomes possible to form the glass film also on the surface of the grooves 5 and the projections T. However, because the oxide layer formed in the decarburization annealing step S05 and having silica as the main component disappears on the surface of the grooves 5 and the surface of the projections T, a state of the glass film is not said to be desirable. In addition, when the inhibitor control is performed by performing the nitridation annealing, the inhibitor is not in a desirable state in the surface layer area of the grooves 5 and an area of the projection T, and the secondary recrystallization in the Goss orientation as a desirable crystal orientation from these areas is not expected. Despite the above, since the finish annealing step S07 is at least performed after the projection formation, the grain growth of the metal structure of the projections T and the encroachment by the secondary recrystallized crystal grains from the steel sheet can be expected.

When the laser irradiation step S99 is performed between the annealing separating agent coating step S06 and the finish annealing step S07, the annealing separating agent in a liquid state acts effectively on the shape control of the surface of the steel sheet, and therefore the laser irradiation is to be performed before drying of the annealing separating agent. The annealing separating agent coated on the surface of the grooves 5 is scattered and lost immediately after the laser irradiation, but as long as the annealing separating agent is in a liquid state, the surface of the grooves 5 is covered with the annealing separating agent again. However, it is necessary to pay attention to molten iron stranded and solidified on the annealing separating agent having a concern for affecting glass film formation thereafter to no small extent and causing occurrence of a local film failure.

When the laser irradiation step S99 is performed between the finish annealing step S07 and the insulating film forming step S08, the insulating film is formed also on the surface of the grooves 5 and the projections T, and therefore a merit regarding film adhesiveness is obtained.

The laser irradiation step S99 can also be performed during the insulating film forming step S08. In the insulating film forming step S08, the insulating coating solution is coated on the steel sheet, and the baking heat treatment is performed, and the insulating coating solution can be utilized for controlling the surface of the steel sheet state of the present invention. After coating the insulating coating solution, the laser irradiation is performed before the baking heat treatment, thereafter performing the baking heat treatment. In this case, no glass film exists on the surface of the grooves 5 and the projections T, but the insulating film is formed anyway. There is a merit in not requiring re-formation of the insulating film to be required in a case of forming the grooves 5 and the projections T in the final product.

When the laser irradiation step S99 is performed after the insulating film forming step S08, no insulating film exists on the surface of the grooves 5 and the projections T, and the re-formation of the insulating film is necessary for securing the rust resistance and the insulating property as described above, and therefore there is no merit in consciously performing in this step.

A point to consider further is that in order to control the shape of the surface of the steel sheet, in a case of performing the laser irradiation step S99 in a state of coating some substance as described later, depending on the performance timing of the laser irradiation step S99 and the substance to be coated, a need to remove the coating substance after the laser irradiation sometimes occurs. For example, in a case of controlling the shape of the surface of the steel sheet by the laser irradiation in a state of coating oil between the decarburization annealing and the nitridation annealing, as long as there is a problem in performing the nitridation annealing with the oil remaining adherent, it is necessary to perform the nitridation annealing after removing the oil by passing the steel sheet through an electrolytic degreasing line, or the like after the laser irradiation.

In terms of this, the case of utilizing the rolling oil as the coating substance between the cold-rolling step S04 and the decarburization annealing step S05, the case of utilizing the annealing separating agent in a liquid state as the coating substance between the annealing separating agent coating step S06 and the finish annealing step S07, and the case of utilizing the insulating coating solution as the coating substance halfway through the insulating film forming step S08 are favorable due to no need for removal of the coating substance.

In view of the above points, as illustrated in FIG. 8, it is particularly preferable to perform the laser irradiation step S99 between the cold-rolling step S04 and the decarburization annealing step S05. In addition, when a means of oil coating on the surface of the steel sheet to be irradiated with the laser is employed as one later-described technique of forming characteristic projections in the present invention, the surface of the steel sheet is inevitably covered with the rolling oil in the steel sheet after the cold rolling, and therefore this point is also very favorable to the performance between the cold-rolling step S04 and the decarburization annealing step S05.

Here, the laser irradiation step S99 will be explained. In the laser irradiation step S99, after coating a specific substance on the surface of the steel sheet, the surface of the steel sheet is irradiated with the laser, and the grooves 5 are formed on the surface of the steel sheet. The projections T are formed accompanying the formation of the grooves 5. Although the above-described specific substance is described later, the above-described specific substance is the rolling oil used in the cold rolling, for example. A laser control condition need not be special, and a publicly known condition is employed. By irradiating the surface of the steel sheet with the laser, on the surface of the steel sheet, the plurality of grooves 5 extending in the direction crossing the rolling direction are formed at predetermined intervals along the rolling direction. These are formed by, for example, transmitting a laser radiated from a laser light source via an optical fiber to a laser irradiation apparatus, irradiating the surface of the steel sheet with the laser by using a polygon mirror and its rotation driving device, and scanning the laser substantially in parallel to a sheet width direction of the cold-rolled steel sheet.

Simultaneously with the laser irradiation, an assist gas such as air or an inert gas may be blown to portions of the steel sheet to be irradiated with the laser. The assist gas is responsible for a role in removing components scattered or evaporated from the steel sheet by the laser irradiation.

Synchronously controlling a rotation speed of the polygon mirror and a conveying speed of the steel sheet in the rolling direction makes it possible to form the plurality of grooves 5 crossing the rolling direction at predetermined intervals along the rolling direction.

As the laser light source, for example, a fiber laser can be used. A high-power laser to be used generally for industry such as an YAG laser, a semiconductor laser, or a $CO_2$ laser may be used as the laser light source. In addition, a pulse laser or a continuous wave laser may be used as the laser light source. As the laser, a single-mode laser having high light harvesting and being suitable for the formation of the grooves 5 is preferably used.

As irradiation conditions of the laser, for example, it is preferable that a laser output is set to 200 to 2000 W, a focused spot diameter (a diameter including 86% of the laser output) of the laser in the rolling direction is set to 10 to 1000 μm, a focused spot diameter of the laser in the sheet width direction is set to 10 to 1000 μm, a laser scanning speed is set to 5 to 100 m/s, and a laser scanning pitch (interval) is set to 2 to 10 mm. In order to obtain a desired groove depth, it is sufficient to regulate these laser irradiation conditions appropriately in publicly known ranges. For example, in a case of obtaining a deep groove depth, it is sufficient to set the laser scanning speed to be slow and set the laser output to be high.

Next, the substance (coating substance) to be coated on the surface of the steel sheet on the occasion of the laser irradiation will be explained. The coating substance is preferably a liquid-state substance such as fats and oils, water, alcohol, colloid, emulsion, the annealing separating agent and the insulating coating solution to be used in manufacturing the grain-oriented electrical steel sheet. In consideration of substances to be used in manufacturing the general grain-oriented electrical steel sheet, or the like, the rolling oil or the fats and oils to be used as a rust preventive oil is easy to handle, and more preferable. The rolling oil is particularly preferable due to no need to be coated again after the cold rolling.

The coating substance satisfies the following two conditions.

(a) To be a substance whose viscosity falls within a specific range and which is in a liquid state and is transformed momentarily by even relatively small force.

(b) To be a substance in which a thickness of a liquid film on the surface of the steel sheet after coating falls within a specific range, which suppresses a spread of the molten iron, and which suppresses deposition of the molten iron on the steel sheet by being interposed between the molten iron and the steel sheet when part of the molten iron is stranded on the liquid film.

Thus, the grain-oriented electrical steel sheet according to the embodiment of the present invention can be manufactured. The steel sheet 1 included in this grain-oriented electrical steel sheet contains, as the chemical composition, in mass %, Si: 0.8 to 7%, C: more than "0" (zero) % and not more than 0.085%, acid-soluble Al: "0" (zero) to 0.065%, N: "0" (zero) to 0.012%, Mn: "0" (zero) to 1%, Cr: "0" (zero) to 0.3%, Cu: "0" (zero) to 0.4%, P: "0" (zero) to 0.5%, Sn: "0" (zero) to 0.3%, Sb: "0" (zero) to 0.3%, Ni: "0" (zero) to 1%, S: "0" (zero) to 0.015%, and Se: "0" (zero) to 0.015%, and the balance consists of Fe and impurities.

This manufacturing method may further have a publicly known manufacturing step for maintaining some property of the grain-oriented electrical steel sheet, such as a brush cleaning step, as necessary.

Hereinafter, a mechanism in which a specific surface shape of the steel sheet 1 is obtained by an influence of the coating substance, and suitable conditions for the coating substance will be explained.

[Regarding Mechanism]

The mechanism in which the present invention effect is obtained by coating the specific substance on the surface of the steel sheet at a time of the laser irradiation is not clear, but is considered as the one which is also matched to a result obtained by researching into influences of various substances as follows at this moment.

Figure 9A:
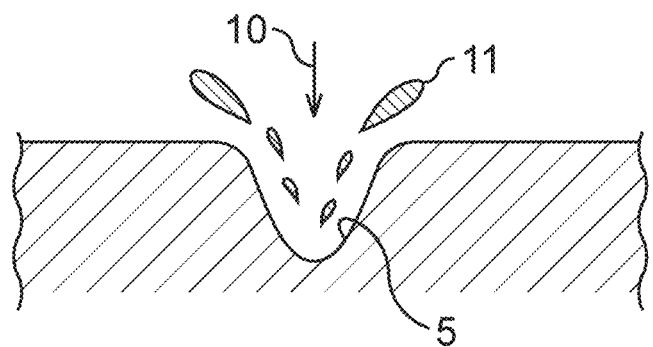
FIG. 9A is a schematic view illustrating occurrence of molten iron by laser irradiation.
Figure 9B:
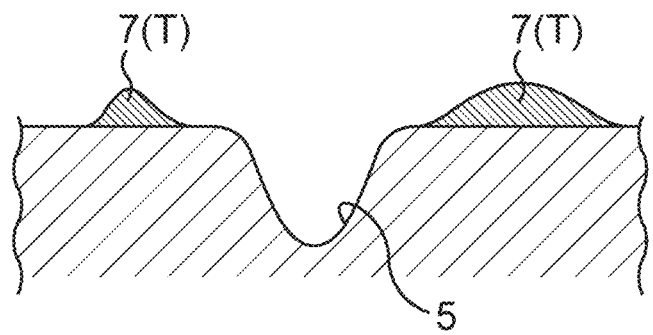
FIG. 9B is a schematic view illustrating formation of projection parts accompanying solidification of the molten iron.

In order to form grooves for the purpose of magnetic domain control, when the surface of the steel sheet 1 is irradiated with laser light 10, steel in the irradiated portion melts momentarily and scatters outside the irradiated portion (FIG. 9A). Thus, the groove 5 is formed, and part of scattered molten iron 11 is deposited on the surface of the steel sheet to form projection parts such as the projections 7 (FIG. 9B).

Figure 9C:
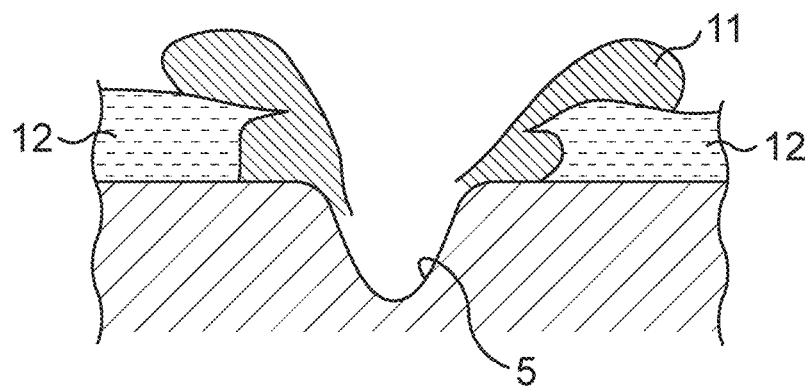
FIG. 9C is a schematic view illustrating occurrence of molten iron by the laser irradiation when a specific substance is coated.
Figure 9D:
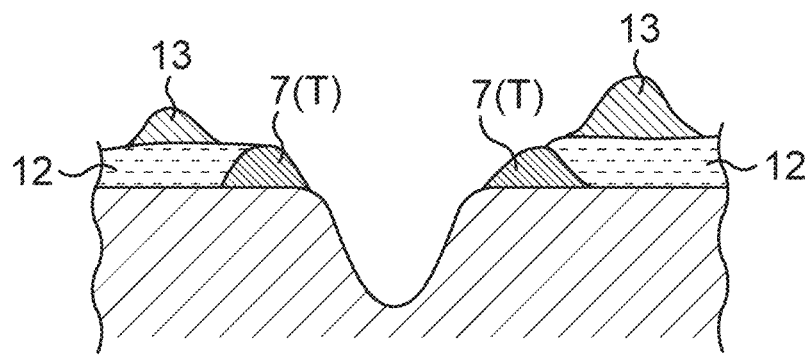
FIG. 9D is a schematic view illustrating formation of projection parts accompanying solidification of the molten iron when the specific substance is coated.

On the other hand, as illustrated in FIG. 9C, as long as a coating substance 12 is coated uniformly in an appropriate state on the surface of the steel sheet at a time of the laser irradiation, the molten iron 11 spreads the specific substance 12 out from the groove 5 to suppress the scattering when the molten iron 11 is pushed out around the groove 5. Thus, a film of the specific substance 12 suppresses the scattering of the molten iron 11 far from the groove 5. In addition, a part 13 of the molten iron 11 is stranded on a coating film of the specific substance 12. As illustrated in FIG. 9D, the molten iron 13 stranded on the coating film solidifies and peels on/from the coating film of the specific substance 12, and does not remain as a weld deposit on the surface of the steel sheet. Therefore, the total amount of weld deposit decreases. Further, because the weld deposit scattered to points far apart from the groove also solidifies and peels on/from the coating film of the specific substance 12, and does not remain as the weld deposit on the surface of the steel sheet, the projections become only the one (projection $T_1$) adjacent to the groove, and the widths of the projections (subsequent to the projection $T_2$) apart from the groove further than the projection $T_1$ are smaller than the width of the projection $T_1$.

Such a weld deposit becomes the projection parts 7 or the projections T and spreads around the groove, thereby causing various kinds of damage as described above, but in the present invention, a decrease in the total amount of weld deposit and limitation of the scattering to the groove periphery make it possible to avoid a decrease in properties.

[Regarding Viscosity]

In view of the above-described mechanism, the coating substance is probably to be prescribed in a state in contact with high-temperature molten iron, but this is not realistic. The invention is prescribed by the viscosity of the coating substance in a state before the laser irradiation in the present invention.

The viscosity of the coating substance is preferably 100 mm$^2$/s or less. As long as some substance which has viscosity and is transformed by force received from the molten iron is coated, the effect of the present invention is considered to be obtained, and therefore a lower limit is not particularly limited, but too high viscosity not only makes handling of coating or the like difficult but also prevents a moderate spread of a molten substance around the groove and deposits it only extremely near the groove 5 to increase heights h of the projection parts, and does not allow a desired V2/V1 to be obtained. Further, too low viscosity decreases an effect of suppressing the scattering of the molten iron from the groove and depositing it around the groove and makes it difficult to control the distance $L_s$ and the projection widths W in specific ranges. The viscosity is preferably 10 to 70 mm$^2$/s, and further preferably 40 to 60 mm$^2$/s.

Further, although the viscosity can be controlled by changing the coating substance, it can also be controlled by changing a temperature or a concentration, for example. The temperature of the coating substance is preferably 10 to 100° C. It is preferably 15 to 60° C., and further preferably 20 to 50° C. The temperature changes the viscosity of the coating substance to affect the invention effect, and an appropriate temperature range is to be determined also in consideration of temperature regulation and ease of handling in the manufacturing step. When the coating substance is set to be the fats and oils or the emulsion of fats and oils, the above-described temperature range roughly corresponds with the desirable range regarding the viscosity.

When the coating substance is some mixture, it is also possible to regulate a concentration thereof and control the mixture to an appropriate viscosity in an easy-to-handle temperature range. In the concentration when colloidal solutions such as the emulsion of fats and oils, the annealing separating agent, and the insulating coating solution which are generally used in the manufacturing step of the grain-oriented electrical steel sheet are coated, the emulsion of fats and oils is 50 to 70% in a volume concentration of the fats and oils with respect to a total of water and the fats and oils, the annealing separating agent is 5 to 80% in a concentration of magnesia with respect to water and the magnesia, and further the insulating coating solution is 20 to 80% in a concentration of aluminum phosphate, colloidal silica, and chromic acid with respect to water, the aluminum phosphate, the colloidal silica, and the chromic acid, which allow control to the viscosity for preferably obtaining a projection control effect of the present invention. Needless to say, an appropriate concentration range is similar to that of the temperature in that regulation of the viscosity for obtaining the invention effect, and the temperature regulation and the ease of handling in the manufacturing step are to be considered.

[Regarding Coating Thickness]

Too small thickness of the coating substance interposes the coating substance between the molten iron and the surface of the steel sheet to decrease an effect of preventing the deposition on the steel sheet 1 and not to decrease V2/V1 sufficiently, and prevents the coating substance from being even an obstacle to the scattering of the molten iron and therefore causes the molten iron to scatter away to excessively increase the width $W_1$ and the distance $L_s$. Too large thickness of the coating substance makes it difficult that the molten iron is stranded on an oil film, deposits the molten iron only extremely near the groove 5 to increase the heights h of the projection parts 7, and does not allow the desired V2/V1 to be obtained. Therefore, the thickness of the coating substance is set to preferably more than "0" (zero) μm and not more than 50 μm, more preferably 0.01 to 25 μm, and further preferably 0.1 to 1 μm.

[Others Regarding Coating Substance]

A boiling point of the coating substance is preferably 100° C. or higher. A too low boiling point evaporates the substance from the groove periphery becoming high temperatures momentarily at a time of the laser irradiation, and the effect of the present invention becomes lost. Even though the substance does not evaporate completely, the thickness of the coating substance becomes small to decrease an effect of keeping the coating substance back around the groove, resulting in that the distance $L_s$ and the projection widths W excessively increase, too thin film makes it impossible to suppress the deposition of the molten iron stranded on the coating film on a base steel sheet, and the desired V2/V1 cannot be obtained. The boiling point is more preferably 130° C. or higher, and further preferably 150° C. or higher. In the case of the mixture, it is preferable to control a boiling point of a solvent.

Note that the above-described embodiment merely illustrates concrete examples of implementing the present invention, and the technical scope of the present invention is not to be construed in a restrictive manner by these embodiments. That is, the present invention may be implemented in various forms without departing from the technical spirit or main feature thereof.

EXAMPLE

Next, examples of the present invention will be described. Conditions in examples are condition examples employed for confirming the applicability and effects of the present invention and the present invention is not limited to these examples. The present invention can employ various conditions as long as the object of the present invention is achieved without departing from the spirit of the present invention.

(Basic Conditions)

Manufacturing conditions of a grain-oriented electrical steel sheet to be used are as follows.

Hot rolling is performed with respect to a slab having a chemical composition which contains, in mass %, Si: 3.0%, C: 0.08%, acid-soluble Al: 0.05%, N: 0.01%, Mn: 0.12%, Cr: 0.05%, Cu: 0.04%, P: 0.01%, Sn: 0.02%, Sb: 0.01%, Ni: 0.005%, S: 0.007%, and Se: 0.001% and in which the balance consists of Fe and impurities, to obtain a hot-rolled steel sheet having a thickness of 2.3 mm.

Sequentially, with respect to the above-described hot-rolled steel sheet, annealing treatment at 1000° C. for 1 minute is performed. Thereafter, pickling and cold rolling are performed to obtain a cold-rolled steel sheet having a thickness of 0.23 mm.

Sequentially, with respect to the cold-rolled steel sheet, decarburization annealing at 800° C. for 2 minutes is performed, and an annealing separating agent containing magnesia (MgO) as a main component is coated on a surface. Publicly known nitridation annealing is performed as necessary.

Sequentially, finish annealing treatment at 1200° C. for 20 hours is performed. As a result, a steel sheet (a steel sheet in which a glass film is formed on the surface) in which a crystal orientation is controlled so that an axis of easy magnetization of crystal grains and a rolling direction correspond with each other is obtained.

On the above-described steel sheet, an insulating coating solution containing colloidal silica and phosphate is coated, heat treatment at 850° C. for 1 minute is performed to obtain finally the grain-oriented electrical steel sheet formed grooves and projections further including the glass film and an insulating film on the surface.

Note that halfway through the above-described steps, coating of a specific substance and laser irradiation are performed, and on the surface of the steel sheet, a plurality of grooves (and projections) extending in a direction orthogonal to the rolling direction are formed at predetermined intervals along the rolling direction. Irradiation conditions of a laser are a laser output: 200 W, a focused spot diameter (86% diameter) of the laser in the rolling direction: 100 µm, a focused spot diameter (86% diameter) of the laser in a sheet width direction: 4000 µm, a laser scanning speed: 16 m/s, and a laser scanning pitch: 4 mm.

Because the present invention effect is not caused by properties of the steel sheet and the laser irradiation conditions, the above is fixed in manufacturing conditions of a general grain-oriented electrical steel sheet except coating substance control before the laser irradiation. The above-described grain-oriented electrical steel sheet to be finally obtained is a normal grain-oriented electrical steel sheet mainly containing Si: 3.0% except for a shape of the projections changing in response to a coating condition of the specific substance on the surface of the steel sheet at a time of the laser irradiation. The coating condition of the specific substance and performance timing including the laser irradiation which are points of the present invention will be explained in each of experimental examples.

Depths of the grooves of the steel sheet to be evaluated are 25 to 30 µm or less and widths of the grooves thereof are 30 to 40 µm, and they fall within a range of shape variations of the grooves in a case of fixing the condition of the laser irradiation and a publicly known range, and are not the special ones.

A magnetic property, rust resistance, an insulating property, and a property when the grain-oriented electrical steel sheet is formed into a wound iron core, of these grain-oriented electrical steel sheets, are measured. In addition, a film of each of these grain-oriented electrical steel sheets is peeled, and a surface shape of each of base steel sheets is specified by a specifying method explained in the above-described embodiment. For measurement of three-dimensional roughness and measurement of a surface roughness parameter (Ra, RSm), a laser type surface roughness measuring instrument (VK-9700 manufactured by KEYENCE CORPORATION) is used. A measured value regarding the projections is an average value of values measured regarding the projections on both sides of the groove.

The rust resistance is evaluated by collecting a 30 mm square test piece from each of the grain-oriented electrical steel sheets, leaving the test piece in an atmosphere having a temperature of 50° C. and a humidity of 91% for one week, being based on a weight change in the test piece before and after the leaving, and using a mass increase rate in the following formula. Since occurrence of rust increases weight of the test piece, the one having a smaller weight increase rate can be judged to be better for the rust resistance.

mass increase rate (%) before and after leaving=100×(after leaving−before leaving)/before leaving The insulating property is evaluated by an interlayer current measured by a method mentioned in JIS C 2550-4.

The magnetic property (magnetic flux density $B_8$, core loss $W_{17/50}$) is evaluated by using a W 60 mm×L 300 mm single sheet in accordance with an H coil method mentioned in JIS C 2556.

As the property when the grain-oriented electrical steel sheet is formed into a wound iron core, a building factor (BF) and a noise are evaluated.

Figure 10A:
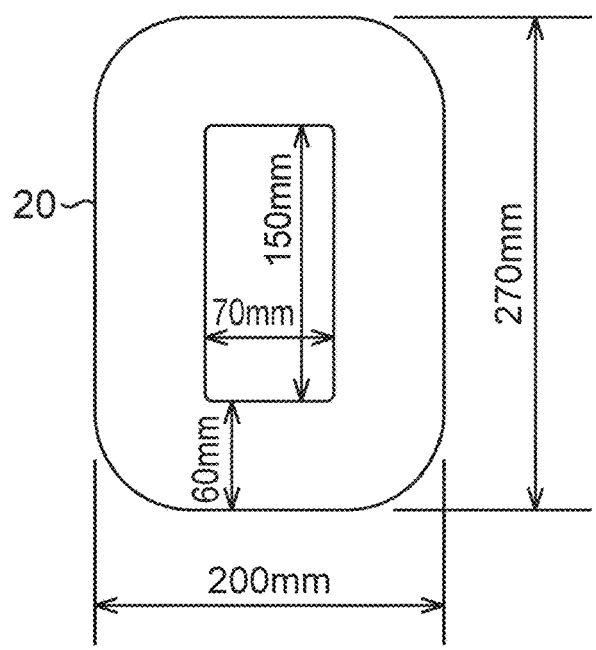
FIG. 10A is a view illustrating dimensions of a wound iron core.
Figure 10B:
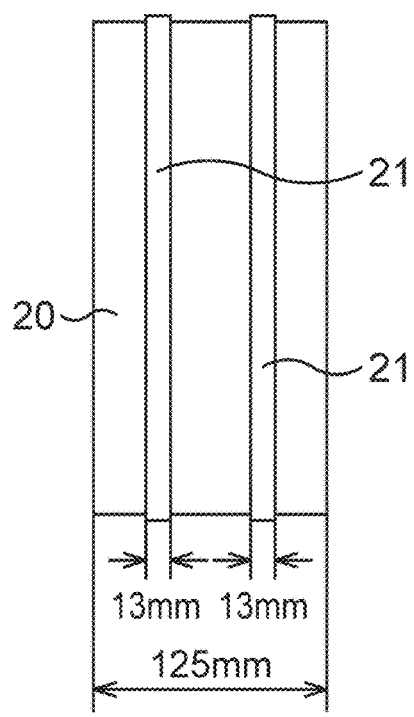
FIG. 10B is a view illustrating dimensions of the wound iron core.

In measurement of the building factor, a wound iron core 20 having dimensions (mm) illustrated in FIG. 10A and FIG. 10B is produced by laminating each of the grain-oriented electrical steel sheets. The wound iron core 20 is tightened by bands 21. Then, with respect to the wound iron core 20, measurement using an exciting current method mentioned in JIS C 2550-1 is performed under conditions of a frequency of 50 Hz and a magnetic flux density of 1.7 T, and a core loss value $W_A$ of the wound iron core is measured. Further, a sample with a width of 100 mm×a length of 500 mm which is formed of only a flat surface portion of each of the grain-oriented electrical steel sheets used for the wound iron core is collected, and with respect to this sample, measurement by an electrical steel sheet single sheet magnetic property test using the H coil method mentioned in JIS C 2556 is performed under the conditions of a frequency of 50 Hz and a magnetic flux density of 1.7 T, and a core loss value $W_B$ of a material steel sheet single sheet is measured. Then, the building factor (BF) is found by dividing the core loss value $W_A$ by the core loss value $W_B$. In the present invention, a smaller BF can be judged to be a smaller adverse effect when a material steel sheet is used as the wound iron core.

In evaluation of the noise, the above-described wound iron core is prepared and excited, and noise measurement is performed. This noise measurement is performed by placing a noise meter in a position of 0.3 m from an iron core surface in a anechoic chamber in which a background noise is 16 dBA and using A weighting as a weighting network. Further, in the excitation, a frequency is set to 50 Hz and a magnetic flux density is set to 1.7 T.

First Experimental Example

Steel sheets in a first experimental example are each produced by a process including nitridation annealing. Table 1 to Table 3 present details.

TABLE 1

COATING CONDITION AND GROOVE FORMING STEP

| TEST No. | COATING SUBSTANCE | CONCENTRATION (%) | TEMPERATURE (° C.) | VISCOSITY (mm²/s) | COATING THICKNESS (μm) | TIMING OF STEP S99 |
|---|---|---|---|---|---|---|
| 1-1 | DAIROLL SZ-48H | 50 | 25 | 46.0 | 0.54 | BETWEEN STEP S04 AND S05 (REMAINING ROLLED) |
| 1-2 | DAIROLL SZ-48H | 50 | 25 | 46.0 | 0.54 | BETWEEN STEP S04 AND S05 (AFTER DEGREASING, RE-COATING) |
| 1-3 | DAPHNE ROLL OIL CU-40 | 50 | 25 | 4.3 | 0.48 | BETWEEN STEP S04 AND S05 (AFTER DEGREASING, RE-COATING) |
| 1-4 | DAPHNE HI TEMP OIL | 50 | 25 | 66.0 | 0.54 | BETWEEN STEP S04 AND S05 (AFTER DEGREASING, RE-COATING) |
| 1-5 | DAPHNE MAGPLUS ED5 | 50 | 25 | 5.5 | 0.48 | BETWEEN STEP S04 AND S05 (AFTER DEGREASING, RE-COATING) |
| 1-6 | DAPHNE OIL COAT No. 9 | 50 | 25 | 15.0 | 0.54 | BETWEEN STEP S04 AND S05 (AFTER DEGREASING, RE-COATING) |
| 1-7 | PURE WATER | 50 | 25 | 0.9 | 0.53 | BETWEEN STEP S04 AND S05 (AFTER DEGREASING, RE-COATING) |
| 1-8 | BENZENE | 50 | 25 | 0.7 | 0.44 | BETWEEN STEP S04 AND S05 (AFTER DEGREASING, RE-COATING) |
| 1-9 | ETHANOL | 50 | 25 | 1.4 | 0.57 | BETWEEN STEP S04 AND S05 (AFTER DEGREASING, RE-COATING) |
| 1-10 | METHYL ACETATE | 50 | 25 | 0.5 | 0.53 | BETWEEN STEP S04 AND S05 (AFTER DEGREASING, RE-COATING) |
| 1-11 | TOLUENE | 50 | 25 | 0.7 | 0.52 | BETWEEN STEP S04 AND S05 (AFTER DEGREASING, RE-COATING) |
| 1-12 | HEXANE | 50 | 25 | 0.5 | 0.51 | BETWEEN STEP S04 AND S05 (AFTER DEGREASING, RE-COATING) |
| 1-13 | HEPTANE | 50 | 25 | 0.6 | 0.51 | BETWEEN STEP S04 AND S05 (AFTER DEGREASING, RE-COATING) |
| 1-14 | ANNEALING SEPARATING AGENT | 50 | 25 | 7.6 | 0.51 | BETWEEN STEP S04 AND S05 (AFTER DEGREASING, RE-COATING) |
| 1-15 | INSULATING COATING SOLUTION | 50 | 25 | 24.0 | 0.46 | BETWEEN STEP S04 AND S05 (AFTER DEGREASING, RE-COATING) |
| 1-16 | ABSENCE | — | — | — | — | BETWEEN STEP S04 AND S05 (REMAIMING DEGREASED) |
| 1-17 | DAPHNE ROLL OIL CU-40 | 50 | 25 | 4.3 | 0.54 | BETWEEN STEP S05 AND S06 (AFTER NITRIDING) |
| 1-18 | ANNEALING SEPARATING AGENT | 50 | 25 | 7.6 | 0.51 | BETWEEN STEP S06 AND S07 |
| 1-19 | DAIROLL SZ-48H | 50 | 25 | 48.0 | 0.50 | BETWEEN STEP S06 AND S07 |
| 1-20 | ABSENCE | — | — | — | — | BETWEEN STEP S07 AND S08 |
| 1-21 | DAIROLL SZ-48H | 50 | 25 | 46.0 | 0.50 | BETWEEN STEP S07 AND S08 |
| 1-22 | INSULATING COATING SOLUTION | 50 | 25 | 24.0 | 0.46 | DURING STEP S08 |
| 1-23 | ABSENCE | — | — | — | — | AFTER STEP S08 |
| 1-24 | ABSENCE | — | — | — | — | WITHOUT FORMING GROOVE |

TABLE 2

GROOVE AND PROJECTION SHAPE

| TEST No. | V1 (μm³) | V2 (μm³) | V2/V1 | h (μm) | Ls (μm) | W₁ (μm) | MAXIMUM VALUE OF $W_n/W_1$ | Ra (μm) | RSm (μm) | AVERAGE NUMBER OF CRYSTAL GRAINS (PIECE) | {110}<001> AREA RATIO (%) |
|---|---|---|---|---|---|---|---|---|---|---|---|
| 1-1 | 612234 | 85713 | 0.14 | 4 | 6 | 9 | 0.16 | 0.80 | 40 | 1.1 | 97 |
| 1-2 | 640118 | 89617 | 0.14 | 4 | 6 | 9 | 0.21 | 0.90 | 40 | 1.0 | 100 |
| 1-3 | 596703 | 322220 | 0.54 | 9 | 21 | 22 | 0.42 | 1.10 | 140 | 1.0 | 100 |
| 1-4 | 640457 | 204946 | 0.32 | 4 | 17 | 14 | 0.33 | 1.20 | 60 | 1.0 | 100 |
| 1-5 | 682218 | 409331 | 0.60 | 7 | 12 | 16 | 0.44 | 1.40 | 80 | 3.2 | 68 |
| 1-6 | 557239 | 239613 | 0.43 | 5 | 5 | 14 | 0.37 | 1.60 | 50 | 1.0 | 100 |
| 1-7 | 632118 | 461446 | 0.73 | 10 | 29 | 37 | 0.76 | 1.80 | 120 | 1.0 | 100 |
| 1-8 | 562111 | 432825 | 0.77 | 9 | 13 | 35 | 0.54 | 1.70 | 100 | 5.6 | 68 |
| 1-9 | 617223 | 333300 | 0.54 | 6 | 17 | 24 | 0.61 | 1.60 | 140 | 2.0 | 75 |
| 1-10 | 666632 | 506640 | 0.76 | 7 | 16 | 18 | 0.55 | 1.40 | 90 | 1.0 | 100 |
| 1-11 | 597213 | 435965 | 0.73 | 8 | 24 | 22 | 0.46 | 1.70 | 110 | 1.9 | 70 |
| 1-12 | 703281 | 407903 | 0.58 | 9 | 21 | 34 | 0.61 | 1.40 | 80 | 2.7 | 66 |
| 1-13 | 723204 | 462851 | 0.64 | 8 | 14 | 26 | 0.31 | 1.20 | 80 | 1.8 | 73 |
| 1-14 | 532015 | 180885 | 0.34 | 5 | 3 | 12 | 0.28 | 0.80 | 60 | 1.3 | 85 |
| 1-15 | 610928 | 171060 | 0.28 | 5 | 7 | 7 | 0.32 | 1.80 | 50 | 1.0 | 100 |
| 1-16 | 685233 | 582448 | 0.85 | 17 | 47 | 46 | 1.75 | 2.10 | 160 | 6.8 | 70 |
| 1-17 | 633568 | 399148 | 0.63 | 9 | 15 | 75 | 0.63 | 1.10 | 145 | 17.1 | 75 |
| 1-18 | 599824 | 395884 | 0.66 | 5 | 11 | 16 | 0.69 | 1.60 | 110 | 18.5 | 68 |

TABLE 2-continued

GROOVE AND PROJECTION SHAPE

| TEST No. | V1 (µm³) | V2 (µm³) | V2/V1 | h (µm) | Ls (µm) | W₁ (µm) | MAXIMUM VALUE OF $W_n/W_1$ | Ra (µm) | RSm (µm) | AVERAGE NUMBER OF CRYSTAL GRAINS (PIECE) | {110}<001> AREA RATIO (%) |
|---|---|---|---|---|---|---|---|---|---|---|---|
| 1-19 | 602247 | 445663 | 0.74 | 15 | 5 | 67 | 0.74 | 1.20 | 70 | 19.0 | 67 |
| 1-20 | 598836 | 544941 | 0.91 | 10 | 2 | 27 | 1.20 | 1.40 | 120 | 20.2 | 16 |
| 1-21 | 610235 | 207480 | 0.34 | 2 | 12 | 16 | 0.34 | 1.50 | 110 | 15.0 | 27 |
| 1-22 | 631972 | 366544 | 0.58 | 6 | 15 | 18 | 0.64 | 1.10 | 100 | 23.8 | 6 |
| 1-23 | 610234 | 24409 | 0.04 | 1 | 1 | 5 | 0.10 | 0.80 | 170 | 30.6 | 2 |
| 1-24 | — | — | — | — | — | — | — | 0.29 | 9 | — | — |

TABLE 3

| TEST No. | PROPERTY | | | | PROPERTY (WOUND IRON CORE) | | |
|---|---|---|---|---|---|---|---|
| | B8 (T) | W17/50 (W/kg) | RUST RESISTANCE (%) | INSULATING PROPERTY (mA) | BUILDING FACTOR (BF) | NOISE (dBA) | EVALUATION |
| 1-1 | 1.92 | 0.67 | 0 | 0 | 0.94 | 21 | INVENTION EXAMPLE |
| 1-2 | 1.92 | 0.67 | 0 | 0 | 0.93 | 24 | INVENTION EXAMPLE |
| 1-3 | 1.91 | 0.72 | 4 | 100 | 0.97 | 30 | INVENTION EXAMPLE |
| 1-4 | 1.92 | 0.74 | 3 | 40 | 0.96 | 29 | INVENTION EXAMPLE |
| 1-5 | 1.92 | 0.76 | 2 | 65 | 0.95 | 28 | INVENTION EXAMPLE |
| 1-6 | 1.91 | 0.75 | 1 | 80 | 0.96 | 28 | INVENTION EXAMPLE |
| 1-7 | 1.89 | 0.80 | 3 | 300 | 0.97 | 29 | INVENTION EXAMPLE |
| 1-8 | 1.89 | 0.82 | 3 | 200 | 0.96 | 28 | INVENTION EXAMPLE |
| 1-9 | 1.91 | 0.76 | 2 | 120 | 0.97 | 27 | INVENTION EXAMPLE |
| 1-10 | 1.92 | 0.74 | 2 | 210 | 0.97 | 27 | INVENTION EXAMPLE |
| 1-11 | 1.90 | 0.79 | 3 | 405 | 0.98 | 28 | INVENTION EXAMPLE |
| 1-12 | 1.89 | 0.78 | 2 | 330 | 0.97 | 29 | INVENTION EXAMPLE |
| 1-13 | 1.91 | 0.73 | 2 | 280 | 0.97 | 28 | INVENTION EXAMPLE |
| 1-14 | 1.91 | 0.69 | 1 | 55 | 0.97 | 27 | INVENTION EXAMPLE |
| 1-15 | 1.92 | 0.68 | 1 | 10 | 0.96 | 26 | INVENTION EXAMPLE |
| 1-16 | 1.84 | 1.01 | 11 | 1600 | 1.07 | 36 | COMPARATIVE EXAMPLE |
| 1-17 | 1.90 | 0.82 | 2 | 120 | 0.97 | 26 | INVENTION EXAMPLE |
| 1-18 | 1.81 | 0.83 | 5 | 50 | 0.97 | 27 | INVENTION EXAMPLE |
| 1-19 | 1.89 | 0.79 | 2 | 80 | 0.98 | 26 | INVENTION EXAMPLE |
| 1-20 | 1.86 | 0.91 | 9 | 1400 | 1.08 | 38 | COMPARATIVE EXAMPLE |
| 1-21 | 1.87 | 0.83 | 4 | 500 | 1.06 | 37 | INVENTION EXAMPLE |
| 1-22 | 1.89 | 0.84 | 4 | 40 | 0.97 | 28 | INVENTION EXAMPLE |
| 1-23 | 1.90 | 0.77 | 12 | 1700 | 1.07 | 36 | COMPARATIVE EXAMPLE |
| 1-24 | 1.92 | 0.87 | 0 | 0 | 1.02 | 38 | COMPARATIVE EXAMPLE |

There are exemplified cases where coating substances having different viscosities are each coated with a temperature of the coating substances and a coating thickness fixed. In test No. 1-1 to No. 1-16, the coating of the coating substances and the laser irradiation were performed between the cold-rolling step S04 and the decarburization annealing step S05. In test No. 1-17, between the decarburization annealing step S05 and the annealing separating agent coating step S06, an annealing separating agent was coated to be thereafter dried, and DAIROLL (manufactured by Daido Chemical Industry Co., Ltd.) was coated further as the coating substance in the step S06, thereafter performing the laser irradiation. In test No. 1-18, between the annealing separating agent coating step S06 and the finish annealing step S07, the annealing separating agent to be coated in the step S06 was used as the coating substance to perform the laser irradiation. In test No. 1-19, between the annealing separating agent coating step S06 and the finish annealing step S07, the annealing separating agent was coated to be thereafter dried, and DAIROLL was coated further as the coating substance in the step S06, thereafter performing the laser irradiation. In test No. 1-19, after the laser irradiation, the step S07 was performed with DAIROLL remaining adherent. In test No. 1-20 and No. 1-21, the laser irradiation was performed between the finish annealing step S07 and the insulating film forming step S08. In test No. 1-22, an insulating coating solution to be coated during the insulating film forming step S08 was used as the specific substance to perform the laser irradiation, thereafter performing baking of an insulating film. In test No. 1-23, after the insulating film forming step S08, the laser irradiation was performed from the top of the film. In test No. 1-24, a process to the formation of the insulating film was performed without forming a groove.

In test No. 1-2 to No. 1-15, after once removing a rolling oil on each of steel sheet surfaces by electrolytic degreasing after the cold rolling, predetermined coating substances were coated under predetermined conditions. DAIROLL SZ-48H was used as the rolling oil in the cold rolling before the coating, and in test No. 1-1, the laser irradiation was performed with the rolling oil remaining adherent on a surface immediately after the rolling. In test No. 1-2 to No. 1-15, the rolling oil was once degreased after the cold-rolling step S04, thereafter re-coating the coating substances. Daphne Roll Oil, Daphne Hi Temp Oil, Daphne Magplus, and Daphne Oil Coat used in test No. 1-4 and the like are manufactured by Idemitsu Kosan Co., Ltd.

Figure 11:
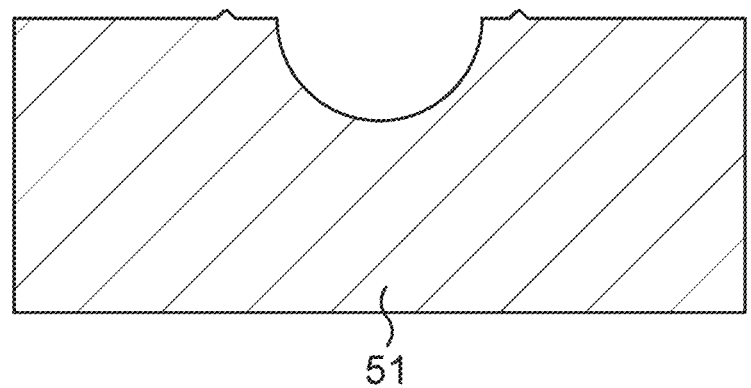
FIG. 11 is a cross-sectional schematic view illustrating a test No. 1-23 steel sheet.

Control of the shape of the surface of the steel sheet and improvement in the properties caused by the coating substances were able to be confirmed. In test No. 1-16 and No. 1-20 in which no coating substance was applied, the control of the projections was not desirable, and the properties deteriorated. Although no coating substance was applied in test No. 1-23, molten iron accompanying groove formation adhered on the film, and therefore projections deposited on the steel sheet were hardly formed. However, since a value of V2/V1 was too small, an effect of improvement in adhesiveness of the insulating film caused by the projections was not obtained sufficiently and part of the insulating film peeled, resulting in a decrease in the rust resistance and the insulating property. FIG. 11 illustrates a sectional view of a steel sheet 51 in test No. 1-23. Further, in the invention examples in which the laser irradiation step S99 was performed prior to the decarburization annealing step S05, since secondary recrystallization at least in their own way occurred in the finish annealing, a crystal grain diameter and a crystal orientation were controlled including the projections, also resulting in a good magnetic property. In test No. 1-24, since no groove was formed, the core loss was not able to be sufficiently reduced.

Second Experimental Example

Steel sheets in a second experimental example are each produced by a process not including nitridation annealing. Table 4 to Table 6 present details.

TABLE 4

COATING CONDITION AND GROOVE FORMING STEP

| TEST No. | COATING SUBSTANCE | CONCENTRATION (%) | TEMPERATURE (° C.) | VISCOSITY ($mm^2/s$) | COATING THICKNESS (μm) | TIMING OF STEP S99 |
|---|---|---|---|---|---|---|
| 2-1 | DAIROLL SZ-48H | 10 | 25 | 5.0 | 0.50 | BETWEEN STEP S04 AND S05 (REMAINING ROLLED) |
| 2-2 | DAIROLL SZ-48H | 25 | 25 | 15.0 | 0.48 | BETWEEN STEP S04 AND S05 (REMAINING ROLLED) |
| 2-3 | DAIROLL SZ-48H | 70 | 25 | 56.0 | 0.51 | BETWEEN STEP S04 AND S05 (REMAINING ROLLED) |
| 2-4 | DAIROLL SZ-48H | 95 | 25 | 92.0 | 0.50 | BETWEEN STEP S04 AND S05 (REMAINING ROLLED) |
| 2-5 | DAIROLL SZ-48H | 50 | 25 | 46.0 | 0.53 | BETWEEN STEP S04 AND S05 (REMAINING ROLLED) |
| 2-6 | DAIROLL SZ-48H | 50 | 50 | 20.0 | 0.47 | BETWEEN STEP S04 AND S05 (REMAINING ROLLED) |
| 2-7 | DAIROLL SZ-48H | 50 | 70 | 10.0 | 0.48 | BETWEEN STEP S04 AND S05 (REMAINING ROLLED) |
| 2-8 | DAIROLL SZ-48H | 50 | 90 | 6.0 | 0.50 | BETWEEN STEP S04 AND S05 (REMAINING ROLLED) |
| 2-9 | DAIROLL SZ-48H | 10 | 25 | 5.0 | 0.50 | BETWEEN STEP S04 AND S05 (AFTER DEGREASING, RE-COATING) |
| 2-10 | DAIROLL SZ-48H | 25 | 25 | 15.0 | 0.50 | BETWEEN STEP S04 AND S05 (AFTER DEGREASING, RE-COATING) |
| 2-11 | DAIROLL SZ-48H | 70 | 25 | 56.0 | 0.50 | BETWEEN STEP S04 AND S05 (AFTER DEGREASING, RE-COATING) |
| 2-12 | DAIROLL SZ-48H | 95 | 25 | 92.0 | 0.50 | BETWEEN STEP S04 AND S05 (AFTER DEGREASING, RE-COATING) |
| 2-13 | DAIROLL SZ-48H | 50 | 25 | 46.0 | 0.50 | BETWEEN STEP S04 AND S05 (AFTER DEGREASING, RE-COATING) |
| 2-14 | DAIROLL SZ-48H | 50 | 50 | 20.0 | 0.50 | BETWEEN STEP S04 AND S05 (AFTER DEGREASING, RE-COATING) |
| 2-15 | DAIROLL SZ-48H | 50 | 70 | 10.0 | 0.50 | BETWEEN STEP S04 AND S05 (AFTER DEGREASING, RE-COATING) |
| 2-16 | DAIROLL SZ-48H | 50 | 90 | 6.0 | 0.50 | BETWEEN STEP S04 AND S05 (AFTER DEGREASING, RE-COATING) |

TABLE 5

GROOVE AND PROJECTION SHAPE

| TEST No. | V1 ($\mu m^3$) | V2 ($\mu m^3$) | V2/V1 | h (μm) | Ls (μm) | $W_1$ (μm) | MAXIMUM VALUE OF $W_n/W_1$ | Ra (μm) | RSm (μm) | AVERAGE NUMBER OF CRYSTAL GRAINS (PIECE) | {110}<001> AREA RATIO (%) |
|---|---|---|---|---|---|---|---|---|---|---|---|
| 2-1 | 641319 | 384791 | 0.60 | 8 | 23 | 30 | 0.74 | 1.70 | 116 | 2.1 | 89 |
| 2-2 | 591241 | 212847 | 0.36 | 6 | 17 | 15 | 0.75 | 1.60 | 80 | 1.0 | 100 |
| 2-3 | 638172 | 51054 | 0.08 | 3 | 12 | 3 | 0.47 | 0.80 | 40 | 1.0 | 100 |
| 2-4 | 684283 | 205285 | 0.30 | 6 | 4 | 4 | 0.15 | 1.60 | 65 | 1.4 | 88 |
| 2-5 | 553281 | 77459 | 0.14 | 4 | 7 | 9 | 0.23 | 1.20 | 55 | 1.0 | 100 |
| 2-6 | 632318 | 145433 | 0.23 | 4 | 18 | 12 | 0.32 | 0.80 | 60 | 1.0 | 100 |
| 2-7 | 562179 | 140545 | 0.25 | 4 | 15 | 14 | 0.44 | 2.00 | 65 | 1.1 | 92 |
| 2-8 | 618429 | 284477 | 0.46 | 6 | 23 | 19 | 0.46 | 1.70 | 90 | 1.5 | 91 |
| 2-9 | 687491 | 426244 | 0.62 | 7 | 25 | 24 | 0.87 | 1.30 | 70 | 1.3 | 87 |
| 2-10 | 532113 | 133028 | 0.25 | 7 | 20 | 15 | 0.44 | 1.40 | 83 | 1.0 | 100 |

TABLE 5-continued

| | | | | | | GROOVE AND PROJECTION SHAPE | | | | |
|---|---|---|---|---|---|---|---|---|---|---|
| TEST No. | V1 ($\mu m^3$) | V2 ($\mu m^3$) | V2/V1 | h ($\mu m$) | Ls ($\mu m$) | $W_1$ ($\mu m$) | MAXIMUM VALUE OF $W_n/W_1$ | Ra ($\mu m$) | RSm ($\mu m$) | AVERAGE NUMBER OF CRYSTAL GRAINS (PIECE) | {110}<001> AREA RATIO (%) |
| 2-11 | 718231 | 79005 | 0.11 | 4 | 13 | 4 | 0.15 | 0.60 | 43 | 1.0 | 100 |
| 2-12 | 532117 | 313949 | 0.59 | 5 | 3 | 2 | 0.34 | 0.90 | 65 | 1.8 | 89 |
| 2-13 | 547233 | 65668 | 0.12 | 5 | 7 | 9 | 0.21 | 0.90 | 55 | 1.0 | 100 |
| 2-14 | 685056 | 198666 | 0.29 | 4 | 12 | 12 | 0.37 | 1.20 | 64 | 1.7 | 92 |
| 2-15 | 607723 | 212703 | 0.35 | 5 | 19 | 16 | 0.62 | 1.50 | 62 | 1.5 | 91 |
| 2-16 | 535932 | 273325 | 0.51 | 7 | 19 | 19 | 0.74 | 1.10 | 86 | 1.2 | 94 |

TABLE 6

| | PROPERTY | | | PROPERTY (WOUND IRON CORE) | | |
|---|---|---|---|---|---|---|
| TEST No. | B8 (T) | W17/50 (W/kg) | RUST RESISTANCE (%) | INSULATING PROPERTY (mA) | BUILDING FACTOR (BF) | NOISE (dBA) | EVALUATION |
| 2-1 | 1.91 | 0.71 | 2 | 50 | 1.07 | 38 | INVENTION EXAMPLE |
| 2-2 | 1.92 | 0.66 | 1 | 0 | 0.93 | 23 | INVENTION EXAMPLE |
| 2-3 | 1.95 | 0.62 | 0 | 0 | 0.94 | 26 | INVENTION EXAMPLE |
| 2-4 | 1.93 | 0.70 | 0 | 60 | 0.97 | 30 | INVENTION EXAMPLE |
| 2-5 | 1.92 | 0.67 | 0 | 0 | 0.94 | 28 | INVENTION EXAMPLE |
| 2-6 | 1.93 | 0.66 | 0 | 0 | 0.97 | 29 | INVENTION EXAMPLE |
| 2-7 | 1.91 | 0.72 | 1 | 10 | 0.98 | 30 | INVENTION EXAMPLE |
| 2-8 | 1.91 | 0.76 | 1 | 10 | 0.97 | 30 | INVENTION EXAMPLE |
| 2-9 | 1.91 | 0.70 | 2 | 30 | 1.06 | 30 | INVENTION EXAMPLE |
| 2-10 | 1.92 | 0.66 | 0 | 0 | 0.94 | 28 | INVENTION EXAMPLE |
| 2-11 | 1.95 | 0.62 | 0 | 0 | 0.95 | 30 | INVENTION EXAMPLE |
| 2-12 | 1.93 | 0.70 | 0 | 45 | 0.98 | 26 | INVENTION EXAMPLE |
| 2-13 | 1.92 | 0.67 | 0 | 0 | 0.94 | 27 | INVENTION EXAMPLE |
| 2-14 | 1.91 | 0.71 | 0 | 0 | 0.94 | 29 | INVENTION EXAMPLE |
| 2-15 | 1.91 | 0.72 | 1 | 5 | 0.96 | 24 | INVENTION EXAMPLE |
| 2-16 | 1.91 | 0.76 | 1 | 10 | 0.98 | 30 | INVENTION EXAMPLE |

In test No. 2-1 to No. 2-16, the coating of the coating substance and the laser irradiation were performed between the cold-rolling step S04 and the decarburization annealing step S05. There are cited examples in which viscosities were changed by concentrations and temperatures in a coating state with the coating substance and a coating thickness fixed. Every coating substance was DAIROLL SZ-48H (manufactured by Daido Chemical Industry Co., Ltd.), and a case of remaining rolled and a case of re-coating after degreasing were evaluated.

Changes in the invention effect accompanying changes in the viscosities can be confirmed, and it is possible to confirm that the viscosities have a particularly desirable range, and it is found that even in the case where the rolling oil is used as the coating substance while remaining rolled, an effect equal to the case of re-coating can be obtained.

Third Experimental Example

Steel sheets in a third experimental example are each produced by a process including nitridation annealing. Table 7 to Table 9 present details.

TABLE 7

| | COATING CONDITION AND GROOVE FORMING STEP | | | | | |
|---|---|---|---|---|---|---|
| TEST No. | COATING SUBSTANCE | CONCENTRATION (%) | TEMPERATURE (° C.) | VISCOSITY ($mm^2/s$) | COATING THICKNESS ($\mu m$) | TIMING OF STEP S99 |
| 3-1 | ABSENCE | — | — | — | — | BETWEEN STEP S04 AND S05 (REMAINING ROLLED) |
| 3-2 | DAIROLL SZ-48H | 50 | 25 | 46.0 | 0.06 | BETWEEN STEP S04 AND S06 (REMAINING ROLLED) |
| 3-3 | DAIROLL SZ-48H | 50 | 25 | 46.0 | 0.22 | BETWEEN STEP S04 AND S07 (REMAINING ROLLED) |
| 3-4 | DAIROLL SZ-48H | 50 | 25 | 46.0 | 0.88 | BETWEEN STEP S04 AND S08 (REMAINING ROLLED) |
| 3-5 | DAIROLL SZ-48H | 50 | 25 | 46.0 | 1.50 | BETWEEN STEP S04 AND S09 (REMAINING ROLLED) |
| 3-6 | ABSENCE | — | — | — | — | BETWEEN STEP S04 AND S05 (AFTER DEGREASING, RE-COATING) |

TABLE 7-continued

COATING CONDITION AND GROOVE FORMING STEP

| TEST No. | COATING SUBSTANCE | CONCENTRATION (%) | TEMPERATURE (° C.) | VISCOSITY (mm²/s) | COATING THICKNESS (µm) | TIMING OF STEP S99 |
|---|---|---|---|---|---|---|
| 3-7 | DAIROLL SZ-48H | 50 | 25 | 46.0 | 0.02 | BETWEEN STEP S04 AND S06 (AFTER DEGREASING, RE-COATING) |
| 3-8 | DAIROLL SZ-48H | 50 | 25 | 46.0 | 0.06 | BETWEEN STEP S04 AND S07 (AFTER DEGREASING, RE-COATING) |
| 3-9 | DAIROLL SZ-48H | 50 | 25 | 46.0 | 0.18 | BETWEEN STEP S04 AND S08 (AFTER DEGREASING, RE-COATING) |
| 3-10 | DAIROLL SZ-48H | 50 | 25 | 46.0 | 0.60 | BETWEEN STEP S04 AND S09 (AFTER DEGREASING, RE-COATING) |
| 3-11 | DAIROLL SZ-48H | 50 | 25 | 46.0 | 1.04 | BETWEEN STEP S04 AND S10 (AFTER DEGREASING, RE-COATING) |
| 3-12 | DAIROLL SZ-48H | 50 | 25 | 46.0 | 1.80 | BETWEEN STEP S04 AND S11 (AFTER DEGREASING, RE-COATING) |
| 3-13 | DAIROLL SZ-48H | 50 | 25 | 46.0 | 2.80 | BETWEEN STEP S04 AND S12 (AFTER DEGREASING, RE-COATING) |
| 3-14 | DAIROLL SZ-48H | 50 | 25 | 46.0 | 4.91 | BETWEEN STEP S04 AND S13 (AFTER DEGREASING, RE-COATING) |
| 3-15 | DAIROLL SZ-48H | 50 | 25 | 46.0 | 8.35 | BETWEEN STEP S04 AND S14 (AFTER DEGREASING, RE-COATING) |
| 3-16 | DAIROLL SZ-48H | 50 | 25 | 46.0 | 13.11 | BETWEEN STEP S04 AND S15 (AFTER DEGREASING, RE-COATING) |

TABLE 8

GROOVE AND PROJECTION SHAPE

| TEST No. | V1 (µm³) | V2 (µm³) | V2/V1 | h (µm) | Ls (µm) | $W_1$ (µm) | MAXIMUM VALUE OF $W_n/W_1$ | Ra (µm) | RSm (µm) | AVERAGE NUMBER OF CRYSTAL GRAINS (PIECE) | {110}<001> AREA RATIO (%) |
|---|---|---|---|---|---|---|---|---|---|---|---|
| 3-1 | 661309 | 555500 | 0.84 | 27 | 12 | 43 | 1.12 | 3.50 | 300 | 7.7 | 75 |
| 3-2 | 592137 | 112506 | 0.19 | 2 | 20 | 7 | 0.66 | 0.60 | 55 | 1.0 | 100 |
| 3-3 | 702034 | 231671 | 0.33 | 3 | 12 | 19 | 0.22 | 1.10 | 30 | 1.0 | 100 |
| 3-4 | 721211 | 411090 | 0.57 | 4 | 5 | 27 | 0.36 | 1.30 | 90 | 1.0 | 100 |
| 3-5 | 702034 | 498444 | 0.71 | 7 | 3 | 19 | 0.22 | 1.10 | 114 | 1.2 | 97 |
| 3-6 | 568393 | 505870 | 0.89 | 25 | 32 | 31 | 2.70 | 4.20 | 215 | 11.2 | 43 |
| 3-7 | 601211 | 66133 | 0.11 | 8 | 45 | 9 | 0.71 | 1.70 | 54 | 1.3 | 95 |
| 3-8 | 623032 | 118376 | 0.19 | 3 | 10 | 6 | 0.56 | 0.90 | 23 | 1.0 | 100 |
| 3-9 | 619023 | 61902 | 0.10 | 2 | 3 | 22 | 0.97 | 0.70 | 38 | 1.4 | 92 |
| 3-10 | 702034 | 105305 | 0.15 | 5 | 7 | 22 | 0.24 | 1.10 | 36 | 1.0 | 100 |
| 3-11 | 721211 | 137030 | 0.19 | 4 | 5 | 15 | 0.30 | 1.30 | 85 | 1.0 | 100 |
| 3-12 | 702034 | 161468 | 0.23 | 7 | 5 | 19 | 0.61 | 1.00 | 110 | 1.0 | 100 |
| 3-13 | 721211 | 238000 | 0.33 | 8 | 10 | 26 | 0.30 | 1.50 | 90 | 1.0 | 100 |
| 3-14 | 721211 | 411090 | 0.57 | 7 | 15 | 26 | 0.36 | 0.90 | 122 | 1.1 | 98 |
| 3-15 | 721211 | 540908 | 0.75 | 8 | 5 | 27 | 0.44 | 1.30 | 144 | 1.5 | 92 |
| 3-16 | 721211 | 620241 | 0.86 | 11 | 2 | 10 | 0.33 | 2.20 | 90 | 9.7 | 50 |

TABLE 9

| | PROPERTY | | | PROPERTY (WOUND IRON CORE) | | |
|---|---|---|---|---|---|---|
| TEST No. | B8 (T) | W17/50 (W/kg) | RUST RESISTANCE (%) | INSULATING PROPERTY (mA) | BUILDING FACTOR (BF) | NOISE (dBA) | EVALUATION |
| 3-1 | 1.84 | 0.93 | 8 | 900 | 1.05 | 38 | COMPARATIVE EXAMPLE |
| 3-2 | 1.92 | 0.68 | 0 | 0 | 0.94 | 23 | INVENTION EXAMPLE |
| 3-3 | 1.93 | 0.67 | 1 | 40 | 0.93 | 26 | INVENTION EXAMPLE |
| 3-4 | 1.91 | 0.72 | 2 | 120 | 0.98 | 30 | INVENTION EXAMPLE |
| 3-5 | 1.92 | 0.67 | 1 | 40 | 0.94 | 28 | INVENTION EXAMPLE |
| 3-6 | 1.83 | 0.96 | 8 | 840 | 1.06 | 35 | COMPARATIVE EXAMPLE |
| 3-7 | 1.92 | 0.67 | 0 | 10 | 0.92 | 26 | INVENTION EXAMPLE |
| 3-8 | 1.93 | 0.67 | 1 | 60 | 0.94 | 23 | INVENTION EXAMPLE |
| 3-9 | 1.91 | 0.70 | 2 | 100 | 0.97 | 29 | INVENTION EXAMPLE |
| 3-10 | 1.93 | 0.67 | 1 | 40 | 0.95 | 26 | INVENTION EXAMPLE |
| 3-11 | 1.90 | 0.69 | 2 | 85 | 0.97 | 27 | INVENTION EXAMPLE |

TABLE 9-continued

| TEST No. | B8 (T) | W17/50 (W/kg) | RUST RESISTANCE (%) | INSULATING PROPERTY (mA) | BUILDING FACTOR (BF) | NOISE (dBA) | EVALUATION |
|---|---|---|---|---|---|---|---|
| | | | PROPERTY | | PROPERTY (WOUND IRON CORE) | | |
| 3-12 | 1.92 | 0.71 | 1 | 40 | 0.94 | 26 | INVENTION EXAMPLE |
| 3-13 | 1.92 | 0.69 | 2 | 125 | 0.98 | 28 | INVENTION EXAMPLE |
| 3-14 | 1.91 | 0.70 | 2 | 120 | 0.97 | 27 | INVENTION EXAMPLE |
| 3-15 | 1.90 | 0.69 | 2 | 120 | 0.97 | 27 | INVENTION EXAMPLE |
| 3-16 | 1.87 | 0.85 | 6 | 635 | 1.05 | 37 | COMPARATIVE EXAMPLE |

In test No. 3-1 to No. 3-16, the coating of the coating substance and the laser irradiation were performed between the cold-rolling step S04 and the decarburization annealing step S05. There are cited example in which the influence of coating thicknesses is confirmed with the coating substance and a viscosity fixed. Every coating substance was DAI-ROLL SZ-48H (manufactured by Daido Chemical Industry Co., Ltd.), and a case of remaining rolled and a case of re-coating after degreasing were evaluated.

Changes in the invention effect accompanying changes in the coating thicknesses can be confirmed, and it is possible to confirm that the coating thicknesses have a particularly desirable range. When the coating thickness is small, a tendency to allow a reduction in the projections can be seen, but scattering of molten iron cannot be suppressed sufficiently, resulting in that the projections are formed in positions apart from the groove. On the other hand, when it is too large, the molten iron cannot be stranded on a film to impair V2/V1, and is concentrated and deposited extremely near the groove. In such a state, variations (Ra, RSm) in projection shape become large, and projections which do not easily cause secondary recrystallization occur locally, resulting in that the magnetic property also has a tendency to decrease.

INDUSTRIAL APPLICABILITY

The present invention allows use in a manufacturing industry and a use industry of a grain-oriented electrical steel sheet for iron core of a transformer, for example.

The invention claimed is:

1. A grain-oriented electrical steel sheet comprising
a steel sheet having a surface on which grooves in which an extending direction crosses a rolling direction and a depth direction is parallel to a sheet thickness direction are formed,
wherein a molten solidified substance ranging in parallel to the groove exists on both sides of the groove on the surface of the steel sheet,
wherein a height becoming a maximum frequency in a height distribution of height data in which the surface of the steel sheet in a specific area including the groove is measured at regular intervals is set as a virtual plane, and when a space volume of recess parts recessed from the virtual plane is set as V1 and a volume of projection parts projected from the virtual plane is set as V2, a value of V2/V1 is more than 0.10 and less than 0.80,
wherein a plurality of projections are formed in the specific area, and among the plurality of projections, a width of a projection closest to the groove is larger than widths of the other projections, and
wherein when an area where an average height in the extending direction is highest in the height distribution is seen in a groove longitudinal cross section including the extending direction and the sheet thickness direction,
an average roughness Ra of a roughness curve forming a surface of the area is 0.30 to 2.00 μm, and
an average length RSm of a roughness curve element forming the surface of the area is 10 to 150 μm.

2. The grain-oriented electrical steel sheet according to claim 1,
wherein a height becoming a 0.02% th in the height data is higher than 1 μm and not higher than 10 μm.

3. The grain-oriented electrical steel sheet according to claim 1,
wherein when a surface shape of the steel sheet around the groove is seen in a groove short side cross section perpendicular to a groove extending direction,
among the projection parts, a distance $L_s$ between an end portion $T_{1s}$ of the projection closest to the groove and an end portion m of the groove is more than "0" (zero) μm and not more than 40 μm.

4. The grain-oriented electrical steel sheet according to claim 1,
wherein among the plurality of projections, a width $W_1$ of a projection closest to the groove is 40 μm or less.

5. The grain-oriented electrical steel sheet according to claim 1,
wherein when among the plurality of projections, $W_1$ represents a width of the projection closest to the groove and $W_n$ represents a width of a projection close to an n-th, n being an integer of 2 or more, a value of $W_n/W_1$ is more than 0.20 and less than 1.00.

6. The grain-oriented electrical steel sheet according to claim 1,
wherein a number of crystal grains existing at a bottom of a highest projection in a cross section perpendicular to the groove extending direction is 10.0 pieces or less on average.

7. The grain-oriented electrical steel sheet according to claim 1,
wherein regarding a crystal orientation of metal structure of a projection in an area where an average height in the extending direction is highest in the height distribution, an area ratio of a {110}<001> orientation is 65% or more.

8. The grain-oriented electrical steel sheet according to claim 1 comprising a glass film on the surface of the steel sheet including a surface of the projection parts and a surface of the grooves.

* * * * *